(12) United States Patent
Aiello et al.

(10) Patent No.: US 6,397,329 B1
(45) Date of Patent: May 28, 2002

(54) METHOD FOR EFFICIENTLY REVOKING DIGITAL IDENTITIES

(75) Inventors: William Aiello, Madison; Sachin Lodha, Piscataway; Rafail Ostrovsky, Secaucus, all of NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/197,392

(22) Filed: Nov. 20, 1998

Related U.S. Application Data
(60) Provisional application No. 60/066,360, filed on Nov. 21, 1997.

(51) Int. Cl.[7] .............................................. H04L 9/00
(52) U.S. Cl. ..................... 713/155; 713/158; 713/168
(58) Field of Search ................................ 713/155, 156, 713/158, 168, 169, 175, 176

(56) References Cited

U.S. PATENT DOCUMENTS

| | | | |
|---|---|---|---|
| 5,666,416 A | * 9/1997 | Micali | 380/23 |
| 5,699,431 A | * 12/1997 | Oorschot et al. | 380/30 |
| 5,960,083 A | * 9/1999 | Micali | 380/23 |
| 6,230,194 B1 | * 5/2001 | Frailong et al. | 709/220 |

* cited by examiner

*Primary Examiner*—Thomas R. Peeso
(74) *Attorney, Agent, or Firm*—Joseph Giordano; James W. Falk

(57) ABSTRACT

In a system using digital identities, such as a public key cryptosystem using public key certificates, each certificate is part of a data revocation structure of tokens maintained by a certification authority (CA). Certificates may then share tokens with other certificates. By updating certain of these tokens periodically to indicate valid (unrevoked and unexpired) certificates, the number of updated records is reduced. Moreover, in response to a status query, a single token is transmitted in response. This results in a more efficient overall use of both computing and communications network resources. In one version of the invention, the data revocation structure is a binary tree. Each certificate includes each zero token for each node in its path from leaf to root of the tree. The tree is updated periodically to indicate valid and revoked certificates. This update operation includes a selection process, in which certain nodes are selected for updating, and a token update process, in which the selected nodes are updated. In the selection process, the fewest number of nodes on the binary tree satisfying the following two properties are selected for updating:

1. At least one selected node is on the path from each non-revoked and not-yet expired digital identity leaf to the root of the tree; and
2. None of the selected nodes is on the path from any revoked or expired digital identity to the root of the tree.

These selected nodes are updated. A token is valid on day i+1 if it has been updated on day i. If on day i+1, a first party A wishes to verify a second party B's public key certificate, party A queries the CA. The CA sends to A one of the valid tokens. A's cryptography device receives the token and performs a one-way function, such as a hash function, on this received token a certain number of times to obtain the Dth value. This value is compared to the value on B's certificate. In a second version of the invention, the data revocation structure is constructed using a more general formulation. Each user's certificate includes a collection of all subsets containing that user. For each of these subsets, there is a chain. The certificate includes the zero token for each chain of each set on the certificate. Similar updating and verification processes are performed using this data revocation structure. In a third embodiment, the updating process is performed incrementally.

35 Claims, 13 Drawing Sheets

METHOD FOR EFFICIENTLY REVOKING DIGITAL IDENTITIES

RELATED APPLICATION

This application claims the benefit of U.S. Provisional Patent Application Ser. No. 60/066,360, filed Nov. 21, 1997, entitled "A Method for Efficiently Revoking Public Key Certificates" for William Aiello, Rafail Ostrovsky, and Sachin Lodha. The contents of that document are incorporated herein by reference.

BACKGROUND OF THE INVENTION

1. Field of the Invention

The present invention relates to a method for efficiently revoking digital identities such as certificates generated by a public-key cryptography system.

2. Discussion of Related Art

Digital Identities

Digital identities (and author-identities of messages) which identify a particular person or entity are important for business, private, and government use of the Internet. For example, digital identities are needed for on-line shopping, business-to-business transactions, on-line banking, code-authentication, company-internal identities, and other network and world wide web related transactions. The U.S. Federal government, NIST, the U.S. Post Office, Visa and Master Card, some major banks, and private companies (like VeriSign, SIAC, IBM, GTE, and Microsoft) are all building digital identity infrastructures. Although the general design of all these schemes is similar, and typically relies on public-key cryptography and Certificate Authority services (both of which are described below), the details (and hence the efficiency) of what it means for a digital identity to be valid, and how it can be revoked differs from scheme to scheme.

Public Key Cryptography

It is often desirable to encrypt a message, such as a digital message, so that only certain authorized persons may access the message. All others are unable to access the message. One way this may be done is by taking the message, called a plain text message, and encrypting it into a cipher text message. The cipher text message appears as gibberish. The cipher text message may be decrypted back into the plain text message only by those having the corresponding private key (described below). Public key cryptography is a well known way to encrypt messages in this way.

Public key cryptography may also be used to provide a "digital signature" to a message. The digital signature is an author identity which verifies that the message originated from the party signing the document. This may be done by a party using its private key to sign a message. The signature may be verified by anyone having the party's public key, but may only be signed by the party having the private key (public and private keys are described below).

In a typical public key cryptography system (also referred to herein as a "public key cryptosystem"), each user u has a public key (or exponent) $PK_u$ and a secret key (or exponent) $SK_u$. For a particular party i, party i's public key $PK_i$ is known to everyone, but the secret key $SK_i$ is known only to party i. A plain text message m to user i is encrypted to form the cipher text message x using a public operation P which makes use of the public key $PK_i$ known to everyone, i.e., $x=P(m,PK_i)$. The cipher text message x is decrypted using a decryption operation D which makes use of the secret key $SK_i$, i.e., $m=D(x,SK_i)$. Anyone given the public key can encrypt a message using the public operation. Only party i who has the secret key $SK_i$ can perform the secret operation to decrypt efficiently the encrypted message x to obtain clear text message m.

A digital signature may be added to a message m to identify that the party "signing" the message is user i, the party identified as the message originator, and not an imposter. A digital signature may be associated with a message m by applying a signing algorithm S on the message m using the signing party's secret key $SK_i$ i.e., $=S(m, SK_i)$. Anyone given that party's public key $PK_i$ may verify the authenticity of the signature by applying a verification algorithm V on the signature using the signing party's public key $PK_i$, i.e. $V(PK_i, m,)$ {valid or not valid}.

FIG. 1 is a block diagram of a typical cryptography device 100, such as may be used in a public key cryptosystem. The device 100 has a processor 102 including one or more CPUs 102, a main memory 104, a disk memory 106, an input/output device 108, and a network interface 110. The devices 102–110 are connected to a bus 120 which transfers data, i.e., instructions and information between each of these devices 102–110. The processor 102 may use instructions in the memories 104, 106 to perform functions on data, which data may be found in the memories 104, 106 and/or received via the I/O 108 or the network interface 110.

For example, a plain text message (or unsigned message) may be input via the I/O 108 or received via the network interface 110. The plain text message (or unsigned message) may then be encrypted (or digitally signed) using the processor 102 and perhaps software stored in the main memory 104 or the disk memory 106. The encrypted message (or digitally signed message) may be transmitted to another party via the network interface 110 connected to a local area network (LAN) or wide area network (WAN). Similarly, a cipher text message (or digitally signed message) may be received via the network interface 110 and decrypted using the processor 102 and perhaps software stored in the main memory 104 or the disk memory 106. The decrypted message, now in plain text, or signature verification may be, for example, viewed on a monitor.

FIG. 2 illustrates a network 200 over which cryptography devices 100 may communicate. Two or more cryptography devices 100, 100, 100 may be connected to a communications network 202, such as a wide area network which may be the Internet, a telephone network, or leased lines; or a local area network, such as an Ethernet network or a token ring network. Each cryptography device 100 may include a modem, network interface card, or other network communication device 204 to send encrypted or digitally signed messages over the communications network 202. A cryptography device 100 may be a gateway to a sub-network 206. That is, the device 100 may be an interface between a wide area network 202 and a local area (sub) network 206.

As discussed in more detail below, in a public key cryptosystem, two communicating parties, such as cryptography devices 100 and 100 may communicate with a third party, such as cryptography device 100, to certify that each party is not an imposter. This third party is often called a certification authority.

One problem with public key cryptography is that for one party, say party A, to communicate with another party, say party B, A needs to obtain party B's public key $PK_B$. A may do this in a number of ways, for example, A's cryptography device may obtain $PK_B$ (1) directly from B's cryptography device, (2) from A's cryptography device's own database (if, for example, A and B have previously communicated), such as disk memory 106, or (3) from a trusted third party such as a certification authority. A security problem arises if B's digital identity is stolen or canceled before it expires.

Certification Authorities

In some public-key cryptosystems, this security problem is avoided by having public keys certified by a trusted third party. This trusted party is often referred to as a certification Authority (CA). A CA issues a public key certificate (PKC), which contains a party's public key, information about the party, such as its name, address, account or serial number, certificate expiration date, the CA's identity, and the CA's digital signature certifying that the public key belongs to the party presenting the certificate. Thus, if A wishes to communicate with B, B sends A its public key $PK_B$ and its public key certificate. A checks the authenticity of $PK_B$ and the public key certificate by checking them against the public keys for B and CA.

Digital identities, such as PKCs, are not unlike credit cards (and indeed may represent a credit card account) in that they typically have an expiration date. Moreover, a digital identity, just like a credit card, may be revoked due to a change in the party's status, a security breach, or other reason. Without a method for certificate revocation, these digital identities may be used by unauthorized parties. Just as with credit cards, occasional revocation is a fact of life. According to some estimates, about 10% of digital identities will usually be revoked before they expire. Thus, an important element of any CA scheme (or hierarchy) is its revocation procedure.

The CA may keep a list of invalid but not yet expired certificates. Thus, when A receives $PK_B$ and its accompanying certificate, A should also check this list to make sure that the certificate is valid, that is, it is not expired or revoked. This typically involves a communication with the CA in each user-to-user transaction, which is an undesirable use of communications network 202 resources.

A digital identity revocation scheme may include one or several trusted certificate authorities which distribute at regular intervals (for example each day) information regarding revoked certificates to several untrusted directories. (The reason for having many directories is to allow replication of data.) For each day, any directory should be able to provide a proof whether any user's u public key is valid or revoked. The directory may provide proof of the revoked status either to the user himself (who can then pass it along to any other user) or any other user who wishes to determine that user's identity is still valid. The critical costs of the scheme are the size of the proof of the validity of user's identity (i.e., this proof should be as small as possible, since this is the most frequently used operation) as well as the communication from the Certificate Authority to the directories for each period.

Prior Solutions to Certificate Revocation

Private-channel solution: Credit Cards

Consider the credit card system where a seller queries a central database to determine whether a customer's credit card is valid and has an available credit limit. This is similar to determining the revocation status of a PKC. This credit card-type solution cannot be used for PKC revocation. This is because there are two fundamental assumptions that are made for the credit card infrastructure which are not necessarily true for a public key infrastructure: (1) a party verifying a credit card assumes it contacts the proper party when it calls the credit card company to verify a card; and (2) the verifying party assumes that the credit card company's database is available on-line, i.e., 24 hours a day, seven days a week, and is relatively up-to-date. These assumptions may not necessarily be true for all public key infrastructures.

Direct Signing Scheme

In this scheme, a CA may regularly sign and send a fresh certificate for each unrevoked public key. User U presents the latest certificate of $PK_U$ when interacting with others. A recipient checks the certificate's date and authenticity. If the certificate has the current date and otherwise is authentic, the certificate has not been revoked as of the last time the certificate was issued. This eliminates the step of verifying the revocation status of the PKC when it is presented. Because Periodically signing and sending all users' certificates (as frequently as every night) is computationally prohibitive and a burden on the communication system. This solution is not used in practice.

Certificate Revocation List

Currently a certificate revocation list (CRL) protocol is used by some CAs. A CRL is a complete list of revoked certificates. The CA periodically (such as daily or bi-weekly) generates and signs a complete list, or a modification of a previous list, of revoked certificates. Whenever the CA is queried about the revocation status of a certificate, the CA presents the inquiring party with the latest CRL. (Alternatively, the CRLs may be sent to the untrusted directories.) The inquiring party may store the CRL for the rest of the day (or other time period) to check the revocation status of public keys of other users if the public key does not appear on the CRL, it is probably valid. There are many variations of the CRL scheme. Because in a typical public key cryptosystem, the number of revoked certificates may be on the order of several hundred thousand, a CRL may be very long. As a result, this scheme has exorbitantly high communications costs.

Micali Scheme

In an improvement on the CRL scheme, one inventor, Micali, uses an off-line/on-line signature scheme called CRS, which is an acronym for "certification revocation scheme." This CRS is designed to reduce CA-to-users communications costs. In Micali's scheme, each certificate has an accompanying secondary token for that certificate which is updated periodically, such as daily. This secondary token is unique to that certificate and is shorter than a typical certificate. During transactions, these short tokens are used as proofs of non-revocation instead of long certificates.

In the Micali scheme, for each user, the CA's cryptography device generates a random number. The cryptography device then uses this random number to generate a chain of tokens unique to that user's certificate. This chain may be generated by repeatedly performing a one-way function, such as a one way hash function, on the random number. (Briefly, a one-way function is a function that is easy to compute but hard to invert on an overwhelming fraction of its range. In a good one-way hash function, given a hash function output value, it is computationally infeasible to determine the input string hashed to that value.)

For a certificate that is valid for D days (or other time period), the random number is hashed D times (say, for example, 365 times for a certificate valid for one year). The 365th hash value is called the zero token. The zero token is included on the certificate signed using the CA's public key. To verify the signer on the ith day (say day 200) the CA sends the D-ith token (i.e., the $165^{th}$ token). The recipient uses his cryptography device to perform the hash function on the D-ith token i times (i.e., 200 times). If the result is the same as the zero token and the zero token has been signed according to CA's public key, the certificate is verified. Given any ith token, it is easy to determine if that token is in the chain of tokens for that certificate by hashing it a certain number of times. The result is compared to the zero token. Given the zero token and all tokens up to and including the i−1 token, however, it is computationally infeasible to determine the ith token (where i<D).

Because these secondary signatures are short (about 100 bits long) and easy to compute, the Micali CRS scheme is preferred over the direct signing scheme and the CRL scheme. One disadvantage is that the scheme requires (for each day) the CA to send N-R tokens to each directory where N is the number of public keys and R is the number of revoked keys. Thus, there is a high communications cost.

Micali also considers the case where a directory may act maliciously by not forwarding the day i-token of a user it received from the CA to the user or verifier. A non-revoked user could thus be considered revoked by a verifier. To prevent this, Micali modifies his scheme as follows. For each user the CA also chooses a random $x'_u$, the "revocation token," and includes $f(x'_u)$ in u's certificate, along with the zero token and other certificate information. When u's public key is revoked, the CA sends the revocation token to the directories. When a directory is queried about a user on day i+1 it returns either the day i token or the revocation token for that user.

In this scheme, the total daily update cost is O(N), meaning on the order of N, where N is the number of certificates. That is, the status of each certificate is updated daily. Therefore, this scheme has a high update cost, even when there are very few current revocations. The expected total daily queries cost is O(Q), meaning on the order of the number of queries. This is because a 100-bit secondary token is provided for each one of the queries. In a typical public key cryptosystem, the values for N and Q are in the several millions. This scheme is "expensive" to implement because it requires a great number of secondary tokens for updating.

Recently, Naor-Nissim have improved upon a scheme by P. Kocher. For the details of the scheme see M. Naor and K. Nissim, "Certificate Revocation and Certificate Update," *Proceedings of USENIX'* 98, the contents of which are incorporated herein by reference. For R revoked keys, in the Naor-Nissim scheme the CA maintains an authenticated 2–3 tree of hash values of depth O (log R). For each public key which is revoked in an update period, the CA updates this special tree by computing O (log R) new hash values. As long as one key is added to this revocation tree the root is recomputed and signed. The CA sends to the directories the lists of users to insert and delete, and a signature of the root. The directories insert and delete the users from the tree, recompute the hash values, and check the signature of the root. When a user queries a directory concerning the revocation status of a key, the directory sends O (log R) hash values and the signature of the root. To verify the revocation status of a key, a user must compute O(log R) hash values, compare them in a specified way with the hash values from the directory and verify the signature of the root hash value. While the CA to directory communication of this scheme is small, in some situations the verification of the revocation status of the user is more expensive than the Micali scheme described above.

It is an object of the present invention to provide a digital identity or public key revocation scheme that is less expensive, in terms of overall computing and communications network resources, than the prior art schemes.

SUMMARY OF THE INVENTION

These and other objects of the present invention are provided by a method according to the present invention. A digital identity revocation scheme includes a plurality of digital identities. This plurality of digital identities is grouped into sets, at least some of these sets including a plurality of digital identities. These sets are associated with revocation checking information. Each of the plurality of the digital identities is associated with revocation checking information for each set to which that digital identity belongs. At least some sets not containing a revoked identity are identified. Revocation status information is generated for the identified sets. Whether or not a particular digital identity is revoked is determined by comparing the revocation status information and the revocation checking information associated with the digital identity.

In a preferred embodiment of the present invention, a list of tokens is part of each digital identity or certificate maintained by the CA's device, such as a cryptography device. Each digital identity or certificate may be grouped into sets with other digital identities' certificates. Each such set is associated with revocation checking information, such as a token. Every digital identity in the set contains the revocation checking information (i.e., token) for that set in its certificate. Revocation status information for the sets may be generated by updating certain of these tokens periodically to indicate valid (unrevoked and unexpired) certificates, the number of updated records is reduced. Moreover, in response to a status query, a single token may be transmitted in response. To verify that a presented identity or certificate is authentic, a one-way function may be performed several times on the received token. In another embodiment, information in addition to the token may be transmitted. If the results of the function match one of the tokens in the certificate, the identity is verified. This results in a more efficient overall use of both computing and communications network resources.

In a first preferred embodiment, the data revocation structure is a binary tree. Each leaf of the binary tree represents a user in the cryptosystem. Each leaf has associated with it a path of nodes from the leaf to the root of the tree. These nodes are shared with one or more other leaves. Each node in the path has a unique value associated with it called the token value. This unique token value is processed at least D times using a one-way function, such as a one-way hash function, where D is the time period that a certificate is valid. This processed value is called the zero token value for that node. The (at least) D intermediate values between the token value and the zero token value comprise a chain of token values associated with that node. For purposes of this application, an i token is the output value of the one way hash function applied to the token value D-i times. Note that given the zero token value, its is computationally infeasible to determine any of the D previous values. Given one of the D previous values, however, it is easy to determine the zero token value by performing the one-way function on the value a certain number of times.

The certificate of the user represented by the leaf includes the zero token value for each node in its path from leaf to root. The tree is periodically updated to indicate valid and revoked certificates. This update operation includes a selection process, in which certain nodes are selected for updating, and a token update process, in which the selected nodes are updated. In the selection process, the fewest number of nodes on the binary tree satisfying the following two properties are selected for updating:

1. At least one selected node is on the path from each non-revoked and not-yet expired certificate leaf to the root of the tree; and
2. None of the selected nodes is on the path from any revoked user-certificate to the root of the tree.

The token update process updates the selected nodes. Assume it is day i of the system. The ith value of a node's chain is selected. This update may be done, for example, by performing the one-way function on the node's token value a certain number of times, or by selecting a pre-computed value stored in a memory.

A certificate may be verified in the following manner. A token is valid on day i+1 if it has been updated on day i. If on day i+1, a first party A wishes to verify a second party B's digital identity (public key certificate), party A obtains a token for party B either from the CA (or other repository, such as a directory or directories) or from party B who obtained the token from the CA. If the digital identity is revoked or expired there is no token available from the revocation structure or, additionally, a revocation token may be sent indicating that the digital identity is no longer valid. If the digital identity is not revoked, the CA sends an updated token. Because (1) each valid certificate has a least one valid token in its chain due to the first selection property described above and (2) each revoked or expired certificate has no valid tokens in its chain due to the second selection property described above, if the certificate has at least one valid token in its chain, it is a valid certificate. The CA sends to A one of the valid tokens. Thus, A has verified that B's digital identity has not been revoked or expired.

A has not yet determined that the certificate it is verifying is authentic, i.e., not a fake or forgery. A's cryptography device receives a token, which is the unique token value of the selected node hashed a certain number of times (i.e., D-i times) to the D-ith value. A's cryptography device performs the one-way function on this received token a certain number of times to obtain the zero token value. Recall that B's certificate includes the zero token value of each node in the path from the node representing the user (the leaf) to the root of the tree. If the value determined by A's crytography device matches one of the zero token values on the certificate A is verifying, then the certificate is verified as belonging to party B.

In a second preferred embodiment, a more general formulation is used to generate the data revocation structure. The universe of users' certificates comprises a number of singleton sets, each containing a digital identity corresponding to a user certificate. These singleton sets are grouped into c disjoint sets (where c is an integer). These c sets are arranged into larger sets. For each of the c sets and larger sets, there is a chain. Each user's certificate includes the zero token value for each chain of each set to which the user belongs. Similar updating and verification processes are performed using this data revocation structure.

In a third embodiment, the updating process is performed incrementally, where the revocation of time period i revokes only those certificates revoked during that time period. As a result, when the data revocation structure is updated, it will consider only those digital identities revoked since the last update, resulting in a more efficient update process. Instead of having the CA provide a single valid token to verify the certificate, on time period i+1, the user presents proof that its certificate was valid for a period from time period 1 through time period i. No valid token exists on the time period that the user's certificate was revoked. Because there is no valid token for that time period, the revoked user (revoked on or before time period i) cannot present a valid token for each time period from time period 1 through time period i.

The present invention is an improvement over the prior art methods. As described below, the invention provides a significant reduction in the overall use of computation and communications network resources.

BRIEF DESCRIPTION OF THE DRAWINGS

The present invention is described with reference to the following figures.

DETAILED DESCRIPTION OF PREFERRED EMBODIMENTS

Several embodiments are described. In a first embodiment, a binary tree is used as a data revocation structure to update unrevoked certificates. Thus, the data revocation structure is grouped into sets and subsets of two. In a second embodiment, a more general formulation is used as a data revocation structure to update unrevoked certificates. In this embodiment, the certificates are grouped into small sets. Bigger sets are formed from these small sets. A third embodiment provides a method for reducing the update costs of the first two embodiments by performing incremental updates.

Although the detailed description describes the invention in connection with public key certificates and cryptography devices, it is understood that the invention disclosed herein is equally applicable to any type of digital identity or other sensitive information such as credit card accounts; and other devices, such as computers.

The Binary Tree (or Hierarchical) Method

In a first preferred embodiment, the present invention is implemented using a binary tree as the data revocation structure. Assume for simplicity of explanation that the number of users is N, where $N=2^l$ and that all certificates are issued on the same day and are valid for D days or other time period. A person skilled in the art recognizes, of course, that these assumptions may be relaxed and are in no way intended to limit the invention.

Generating the Data Revocation Structure

Figure 1:
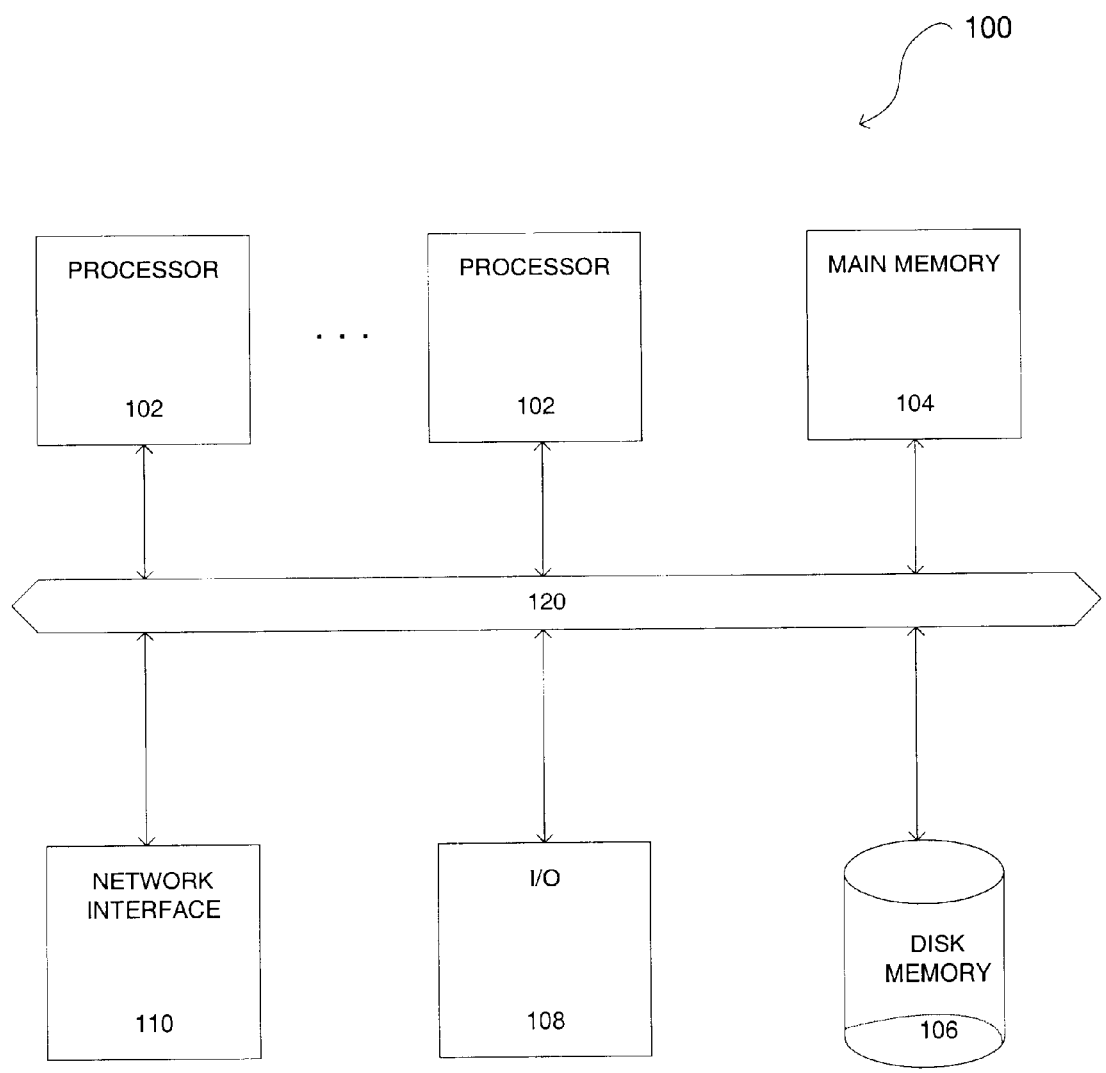
FIG. 1 is a block diagram of a typical cryptography device.
Figure 2:
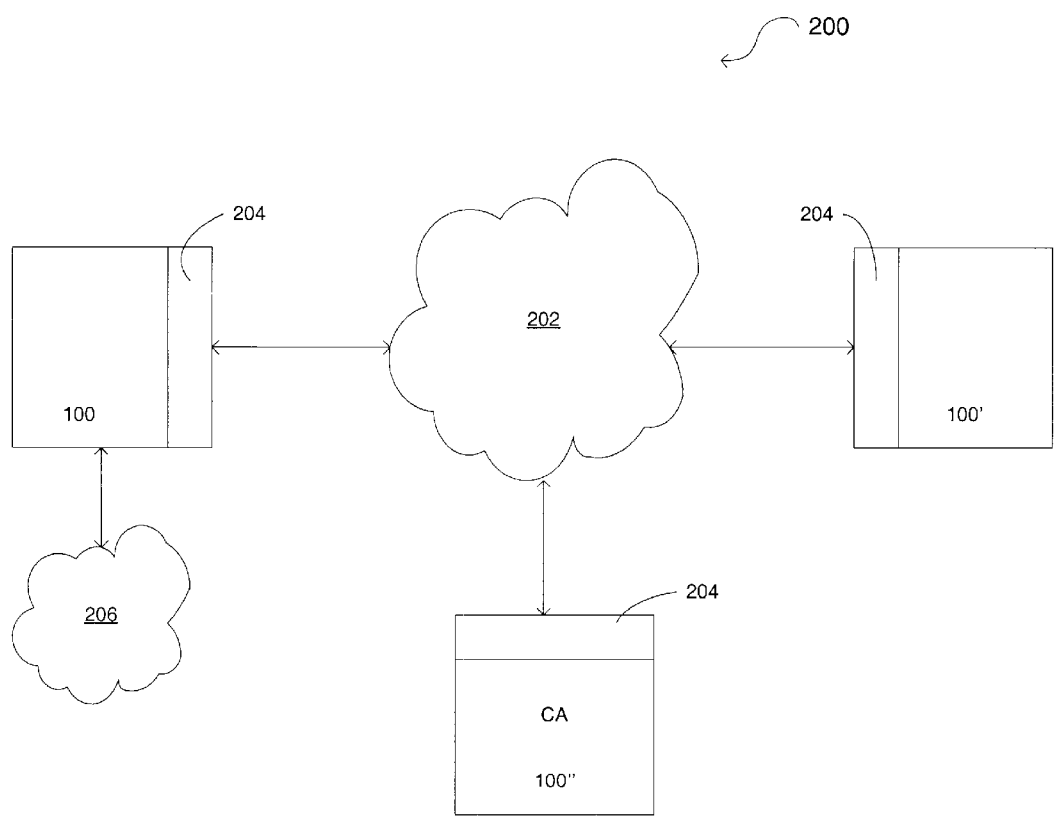
FIG. 2 is a simplified diagram illustrating a network over which cryptography devices may communicate.
Figure 3:
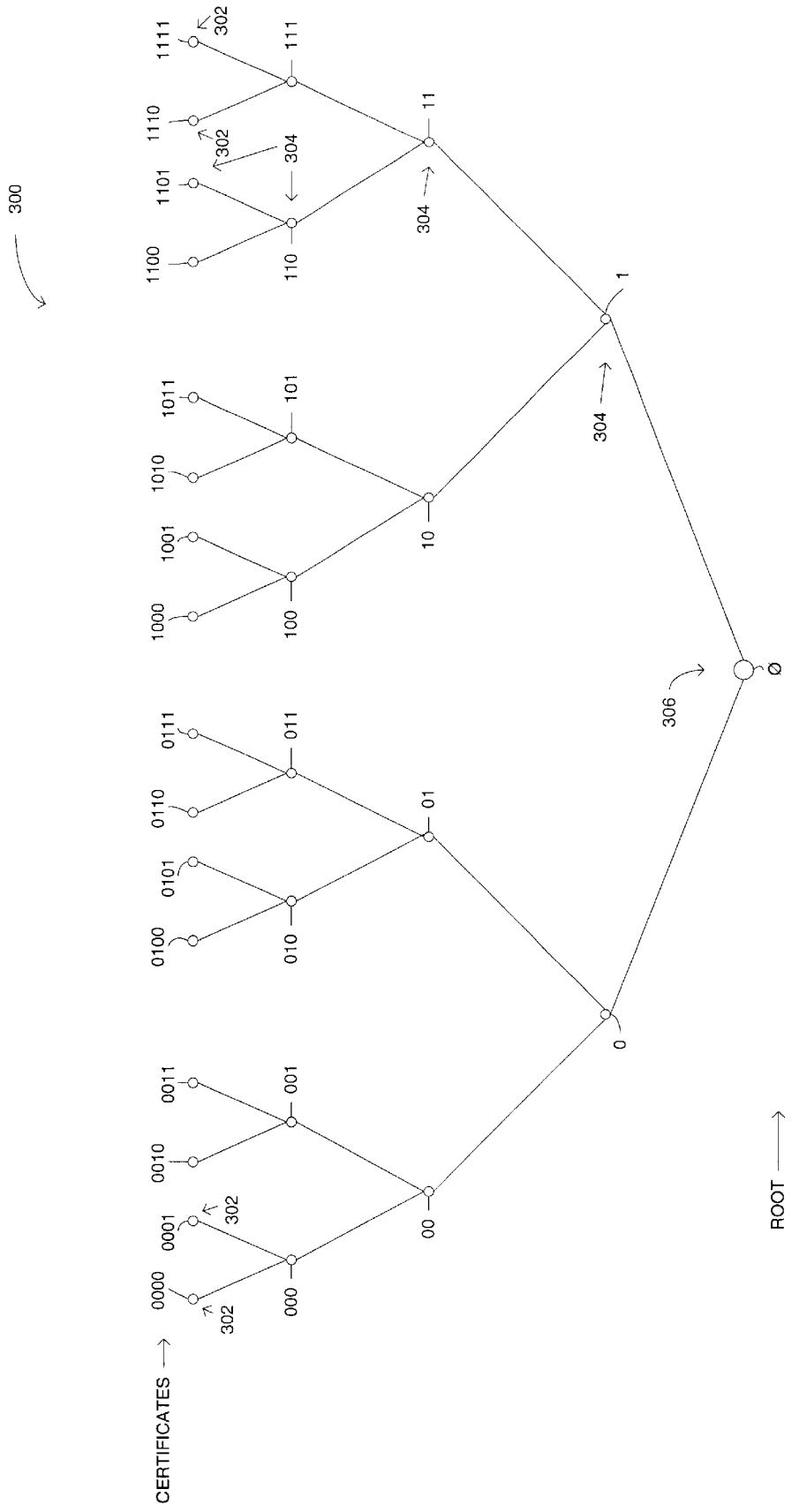
FIG. 3 illustrates a binary tree generated according to a first embodiment of the present invention, each node of the tree being assigned a unique value.

The CA's cryptography device, such as the device 100 of FIG. 1, generates a binary tree having N leaves, each leaf representing one user's digital identity. This binary tree may be stored in a storage medium, such as main memory 104 or disk memory 106 of FIG. 1, or other storage medium. The height of the tree is l and the tree has 2N−1 nodes. A pair of leaves at level l share a node at level l-1. A pair of nodes at level l-1 share a node at level l-2, and so on to the root. FIG. 3 illustrates such a binary tree 300 where l=4 and N=16. Note that the tree 300 has 16 leaves 302, each representing a digital identity. The tree also has a total of (2×16)-1=31 nodes 304.

Associated with each node 304 of the tree 300, including the leaves 302, is a secondary signature, hereinafter referred to as a token. The tokens, and thus the tree, may be generated by the CA's cryptography device in the following manner. Each leaf (i.e., each user's digital identity) is associated with a unique number r having l information elements (such as bits or symbols) (here, l=4). The root 306 of the tree is the null set (i.e., no bits or symbols). Each child of the root is labeled 0 and 1, respectively. For each node having a binary string s of less than l, each child is labeled s0 and s1, respectively. The value of the strings associated with each node of the tree 300 are illustrated in FIG. 3. In a more preferred alternative, each node is assigned a random string. The string at a particular node is that node's initial token value. For a given node u, this initial token value is $Y^0_u$.

Figure 4:
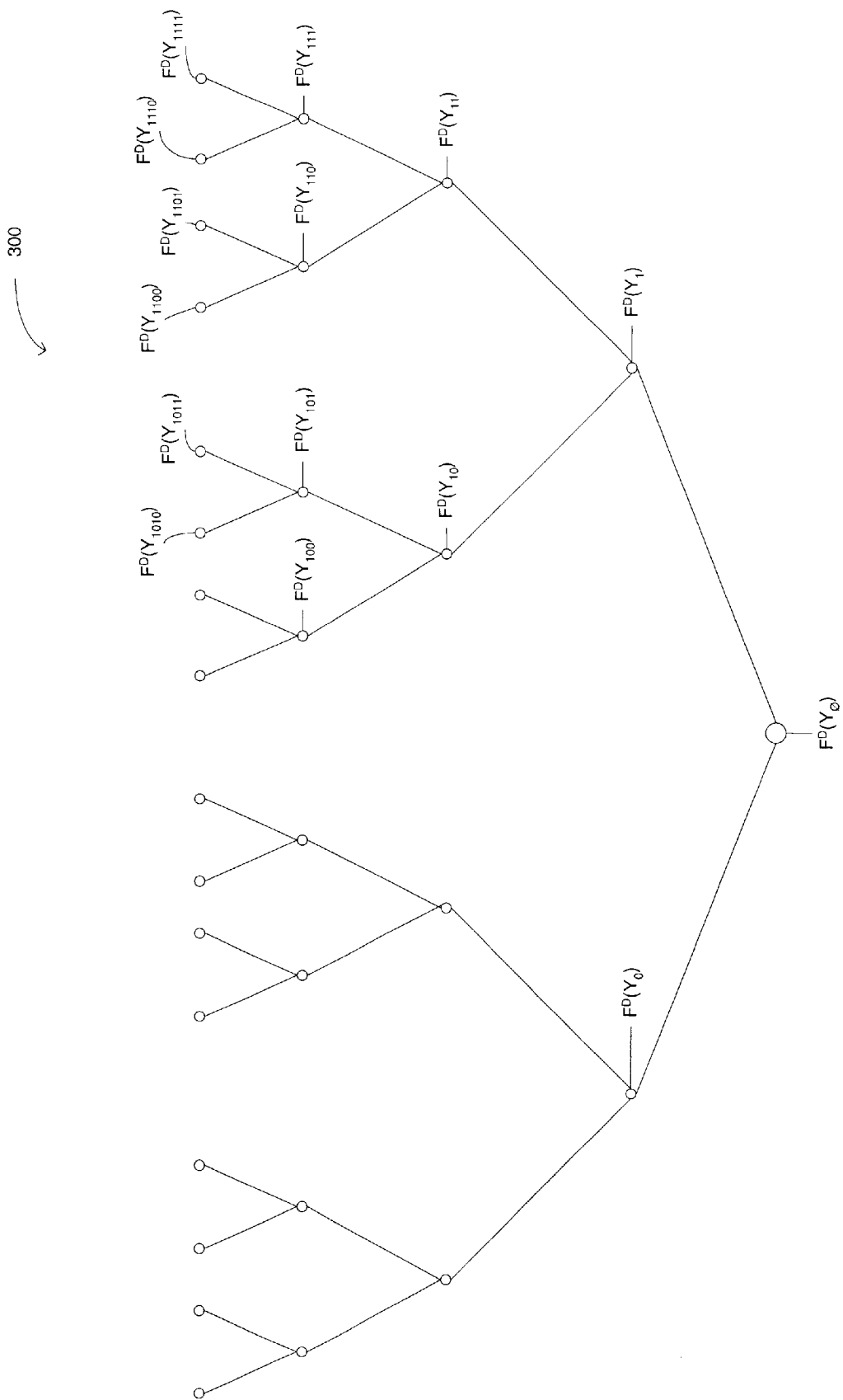
FIG. 4 illustrates the binary tree of FIG. 3 showing the zero token values of certain nodes.

Then, the CA's cryptography device 100 performs a one-way function, such as a one-way hash function, at least D times on each $Y^0_u$. The one-way hash function may be, for example one of the following: Shared Hash Algorithm (SHA), Message Digest 4 (MD4), Message Digest 5 (MD5), or some other suitable one-way hash function. This gives a zero token value $Y_u = F^D(Y^0_u)$, where F represents the hash function. FIG. 4 illustrates the tree 300 showing the zero token values for some of the nodes. It may be desirable (but not required) to save in a memory the result of each hashing from the initial token value to the zero token value. Thus, a particular value to be presented to an inquiring party may be retrieved from memory rather than computed.

Making A Certificate

When the CA's cryptography device, such as the device 100 of FIG. 1, generates a certificate for a user, the certificate includes l+1 (i.e., $\log_2 N+1$) new quantities: the zero token values $Y_u$ for each of the l+1 nodes between (and including) the leaf 302 representing that user's certificate and the root 306. Thus, each certificate has a list of zero token values for the l+1 nodes. A certificate may be stored in a medium, such as main memory 104, disk memory 106 of FIG. 1, or other storage medium. For example, referring to FIG. 4, the certificate for the user represented by the right-most leaf includes the following chain of 4+1=5 zero token values:

$F^D(Y_{1111})$
$F^D(Y_{111})$
$F^D(Y_{11})$
$F^D(Y_1)$
$F^D(Y)$

Update Operation

Assume that on day i, $R_i$ certificates are revoked at some point, up to and including day i. Each day (say, for example, at the end of each day), the CA's cryptography device performs an update operation comprising a selection process and a token update process.

The Selection Process

The CA's cryptography 100 device selects for updating the fewest number of nodes 304 on the tree 300 satisfying the following two properties:

1. At least one selected node is on the path from each non-revoked and not-yet expired digital identity leaf 302 to the root 306 of the tree; and
2. None of the selected nodes is on the path from any revoked digital identity to the root 306 of the tree. (Note that an expired digital identity has no node associated with it.)

The set of nodes selected during this selection process for day i is herein referred to as "the complement cover of $R_i$," because it represents the group of unrevoked digital identities.

Figure 5:
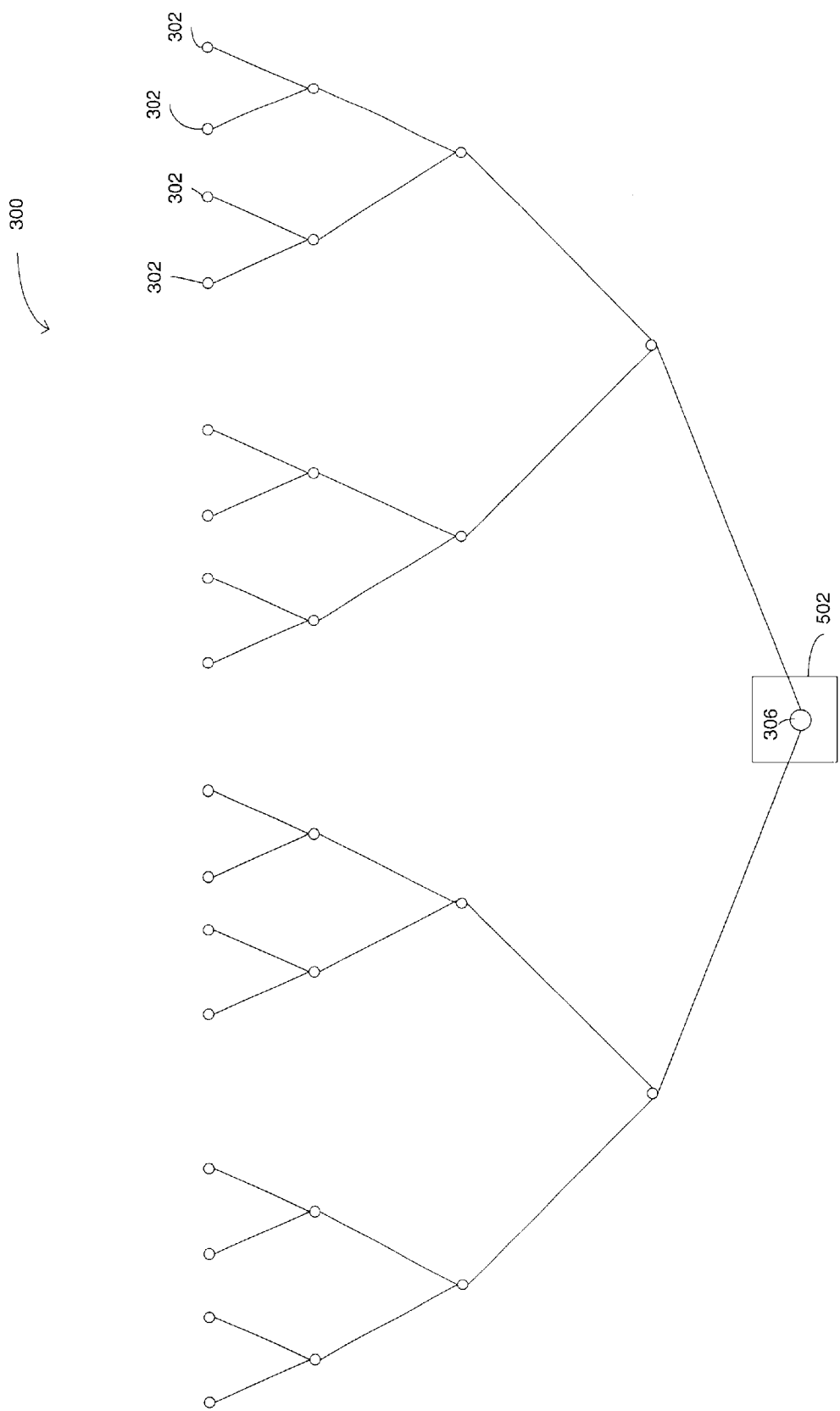
FIG. 5 illustrates the results of a selection process of the first embodiment of the present invention wherein no certificates are revoked.
Figure 6A:
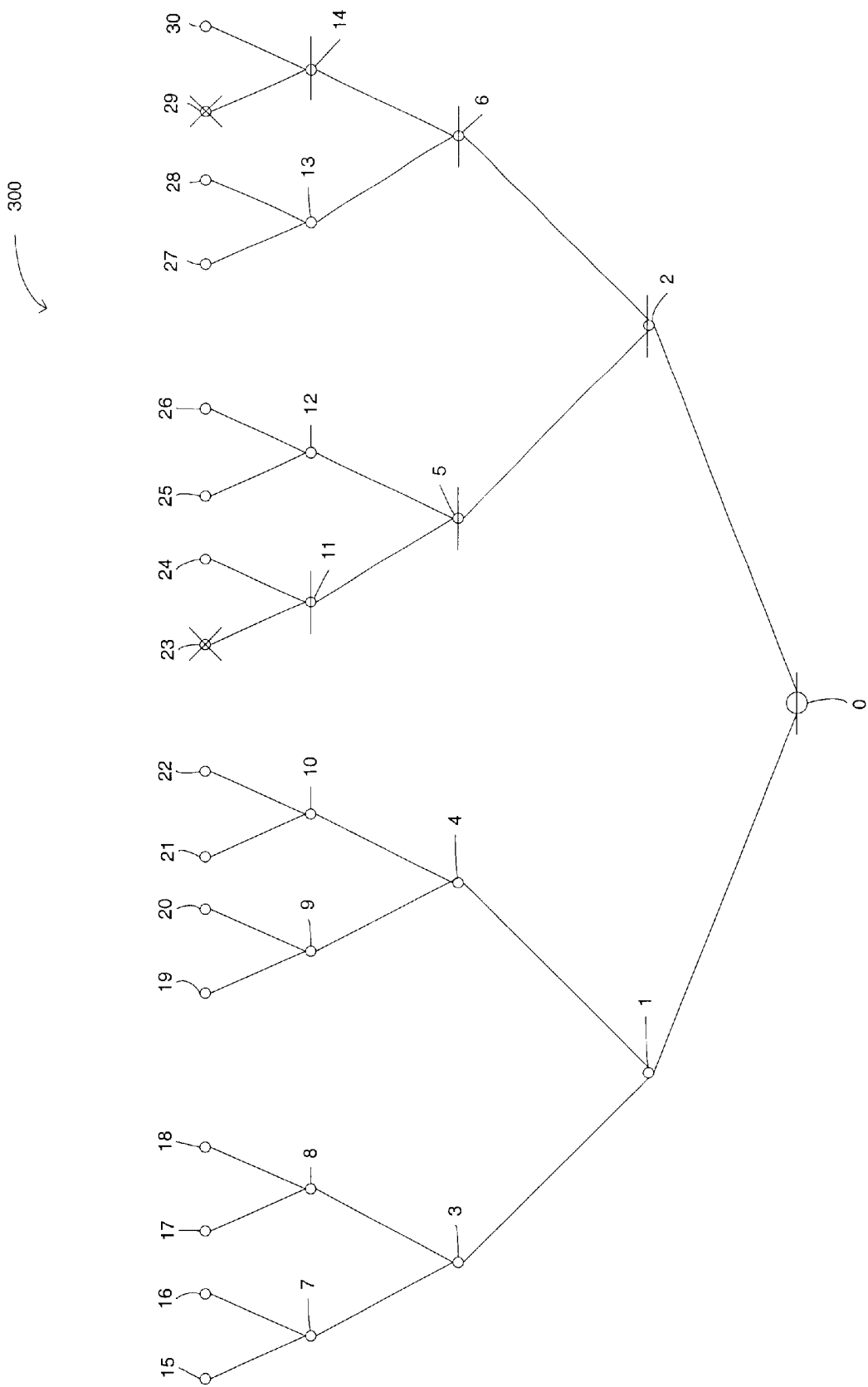
FIGS. 6A and 6B illustrate the results of a selection process of the first embodiment of the present invention wherein certain certificates are revoked.
Figure 6B:
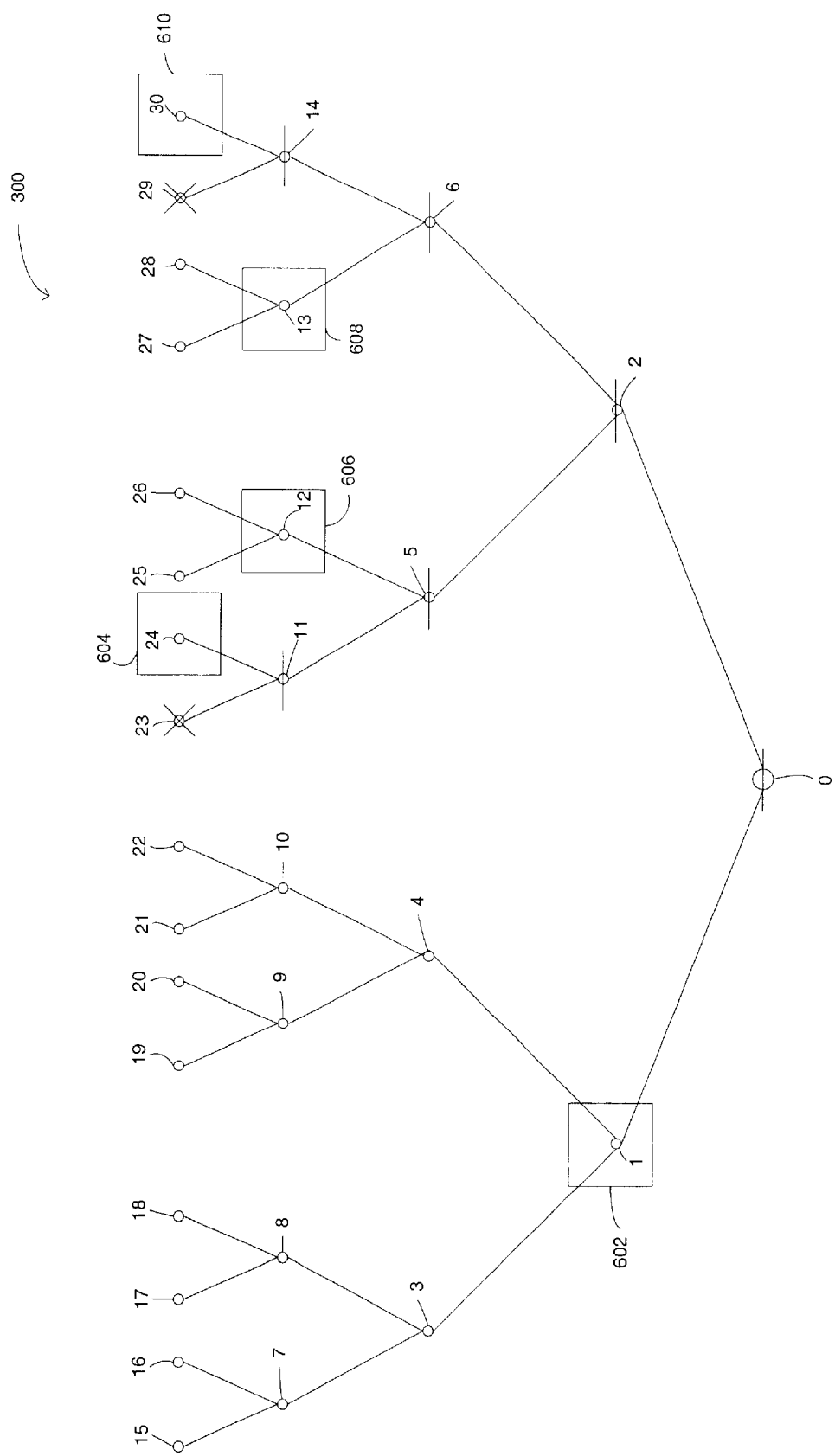

FIGS. 5, 6A, and 6B illustrate the complement cover selection process performed by the CA's cryptography device 100. In FIG. 5, assume that no certificate (or other digital identity) has been revoked. Here, the selected node may be the root 306. This is because the root 306 is (1) on the path to all of the valid (non-revoked and unexpired) certificates and (2) is not on the path from any revoked certificate. The box 502 around the root 306 represents the root's selection. A total of one out of the thirty-one nodes is selected for updating.

In this example, the largest set of unrevoked certificates is the entire data revocation structure. Thus, the root 306 of the entire structure is selected as the token to be updated.

In FIGS. 6A and 6B, the nodes are numbered from 0 to 30 for illustrative purposes. Assume that the certificates (or other digital identities) represented by nodes 23 and 29 are revoked. As seen in FIG. 6A, the revoked leaves are marked with Xs. For each unrevoked certificate, the largest set having no revoked certificates as members is found. Because the second selection property requires that no node may be selected from a path including a revoked certificate, the CA's cryptography device 100 eliminates from selection the nodes in these revoked certificates' chains. These eliminated nodes, also referred to as non-selected nodes, are identified in FIG. 6A by a strike through.

Once these non-selected nodes are determined, nodes satisfying the first property that at least one node is selected from the path from each valid certificate leaf 302 to the root 306 of the tree may be selected. As seen in FIG. 6B, this may be done by selecting siblings (i.e., nodes sharing the same "parent" node) of non-selected nodes if such a sibling exists. Thus, selected nodes are siblings of non-selected nodes. This also assures that the fewest number of nodes satisfying the two properties is selected. As seen in FIG. 6B, for leafs 15–22, node 1 is the sibling of non-selected node 2 and is selected (again, a box 602 is used to indicate selection). Node 24 is the sibling of non-selected node 23, so the node 24 itself is selected (indicated by box 604). For nodes 25 and 26, node 12 is selected (indicated by box 606). For nodes 27 and 28, node 13 is selected (indicated by box 608). For node 30, node 30 is itself selected (indicated by box 610). A total of five of the thirty-one nodes are selected for updating.

Note that in the CRS scheme, each valid certificate is updated daily. In the foregoing examples, the CRS scheme would have updated sixteen and fourteen certificates, respectively. In contrast, the present invention updates only one (in the first example) and five (in the second example) tokens. As a result, the update costs of the present invention are significantly less than the update costs of the CRS method.

The Token Update Process

After the selection process is completed, the CA's cryptography device performs the token update process for updating the selected tokens. Assume it is day i of the system. For each node u selected in the selection process, the selected token is updated from a previous token value to the D-ith token value, that is $Y^{D-i}_u = F^{D-i}(Y \ldots) Y^{D-i}_u = F^{D-i}_u (Y^0_u)$. For example, if i=200 (the end of the 200$^{th}$ day of the certificate), then the new token value will be $Y^{165}_u = F^{165}(Y^0_u)$. This may be done by the cryptography device 100 performing the one-way function on the initial token value D-i times or selecting from a memory 104, 106 a pre-computed value. Note that in FIG. 5, although there are thirty-one nodes and sixteen valid certificates, only one node is updated. In FIGS. 6A and 6B, there are thirty-one nodes and fourteen valid certificates, but only five tokens are updated.

Verifying A Certificate

A token is valid on day i+1 if it has been updated on day i. If on day i+1, a first party A wishes to verify a second party B's public key certificate, party A queries the CA (or directory) or party A may obtain the day i token directly from party B, who obtained the token that day from the CA or directory. In response to the query, the CA determines if any of the tokens in B's certificate's path of l+1 nodes is valid. Because (1) each valid certificate has at least one valid token in its path due to the first selection property described above and (2) each revoked or expired certificate has no valid tokens in its path due to the second selection property described above, if the certificate has at least one valid token in its path, it is a valid certificate.

If the CA determines that B's certificate has no valid tokens, it sends nothing to A in response to the query or otherwise indicates to A that B's certificate has been revoked. (To prevent an untrusted directory from maliciously withholding B's valid token, a revocation token may be provided, as discussed above with respect to Micali's CRL scheme.) Otherwise, the CA sends to A one of the valid day i token values. A's cryptography device receives the token value, which is $F^{D-i}(Y^O_u)$. A's cryptography device performs the one-way function, such as a hash function, on this token value i times to obtain $F^D(Y^O_u)$. That is, if it is day 200 in a 365 day system, $F^{165} Y^O_u$ is hashed 200 times to obtain $F^{365} (Y^O_u)$. Recall that this is also the initial token value which is found on B's certificate. If the two values match, then the certificate is valid and belongs to party B.

The Cost of the Binary Tree Method

In the binary tree method described above, the update cost and communications cost are proportional to the number of tokens the CA updates.

The inventors have found that the update cost is:

T(N,r)r log(N/r) for all (N,r) such that r N where:

T(N,r)=the number of tokens the CA needs to update in an N leaf tree having r number of revoked leaves. That is, the inventors have found that the update cost is O(Rlog (N/R)) and is always less than the update cost of the Micali scheme, in which the update cost is N−r. In practice, the value of r/N is quite small and therefore the advantages of the present invention over the CRS scheme are likely to be great.

The inventors have found that the communications cost for the binary tree method is O(Q), meaning on the order of the number of expected queries. Thus, the costs for CA-to-directory communications of the present invention is less than the cost for CA-to-directory communications of the Micali scheme. Because both the Micali CRS scheme and the binary tree scheme involve the CA (or directory) transmitting a hash value (typically a 100 bit number) to a party in response to a query, the communications costs are about the same.

The analysis of these findings may be found in provisional application 60/066,360, the contents of which are incorporated by reference.

The Generalized Hierarchical Method

In a second preferred embodiment, the present invention is implemented using a more general formulation to generate the data revocation structure. Assume a universe U having N users. Let R be a subset of U and let S and F be families of subsets of U. Here, U is the total number of digital identities handled by a CA, R is the total number of revoked digital identities, S is a complement cover of R, and F is a complement cover family of U.

Note that:

1. S is a complement cover of $Ri_{WS}W=R$ (where W represents the sets in the family of S); and
2. F is a complement cover family of Ui for every subset R of U, F contains a complement cover of R. That is, for every subset R of U, there is a subset S of F such that S is a complement cover of R.

Thus, both S and F include a number of subsets. The union of the subsets equals U-R, which is the number of unrevoked digital identities. For every subset R of U, there is a unique subset S of F which is a complement cover of R. These unique subsets are referred to herein as "unique complement cover families."

In this embodiment of the present invention, a unique complement cover family may be used as a data revocation structure for digital identity or certificate revocation, in the same manner as the binary tree was used above. Indeed, it will be shown that the binary tree is a species of this general method.

Generating The Data Revocation Structure

Assume for simplicity that the set of certificates (or other digital identity) U has a size $N=c^l$, where c is an integer and a parameter of the method. The CA's cryptography device, such as the device 100 of FIG. 1, generates a data revocation structure having c disjoint groups, $U_1, U_2, \ldots U_c$. This provides data structures having smaller complement covers. The first subset put into the family is the entire set of $c^l$ elements. Next the elements are divided into c subsets of size $C^{l-1}$ each and these subsets are put into the family. These are level one subsets. Further divide each level one subset into c subsets of size $c^{l-2}$. These are level two subsets. Continue dividing the subsets and adding them to the family until all the level l subsets of size one have been added to the family. The collection of level i subsets which are subsets of the same level i 1 subset are called siblings and the level i 1 subset is called their parent. For example, in FIG. 7, {4}, {5}, and {6} (sets 723, 724, 725, respectively) are siblings in level two and their parent is {4,5,6} (set 706). Note that thus far we have $(c^{l+1}1)(c1)$ subsets in the family and every element of U is in l+1 sets.

If c=2, the data revocation structure is complete. Otherwise, the family continues as follows. For each collection of sibling subsets do the following. First, form subsets which are the union of any two siblings. There are $(c_2)$ such subsets. Add these to the family. Then, form the subsets which are the union of any three siblings. There are $(c_3)$ such subsets. Add these to the family. In general, form the $(c_i)$ subsets which are the union of i siblings, for 1<i<c, and add these to the family. This completes the subsets of the family.

Using edges to represent the (maximal, nontrivial) subset relation, this complement cover family can be represented by a graph. See FIG. 7 for an example where c=3 and $N=3^2$.

The size of this family is:

{c^1~~~1} over {c~~~1}~(2 sup c~~~2)~+~1~~N~{2 sup c} over {c~~~1}

Figure 7:
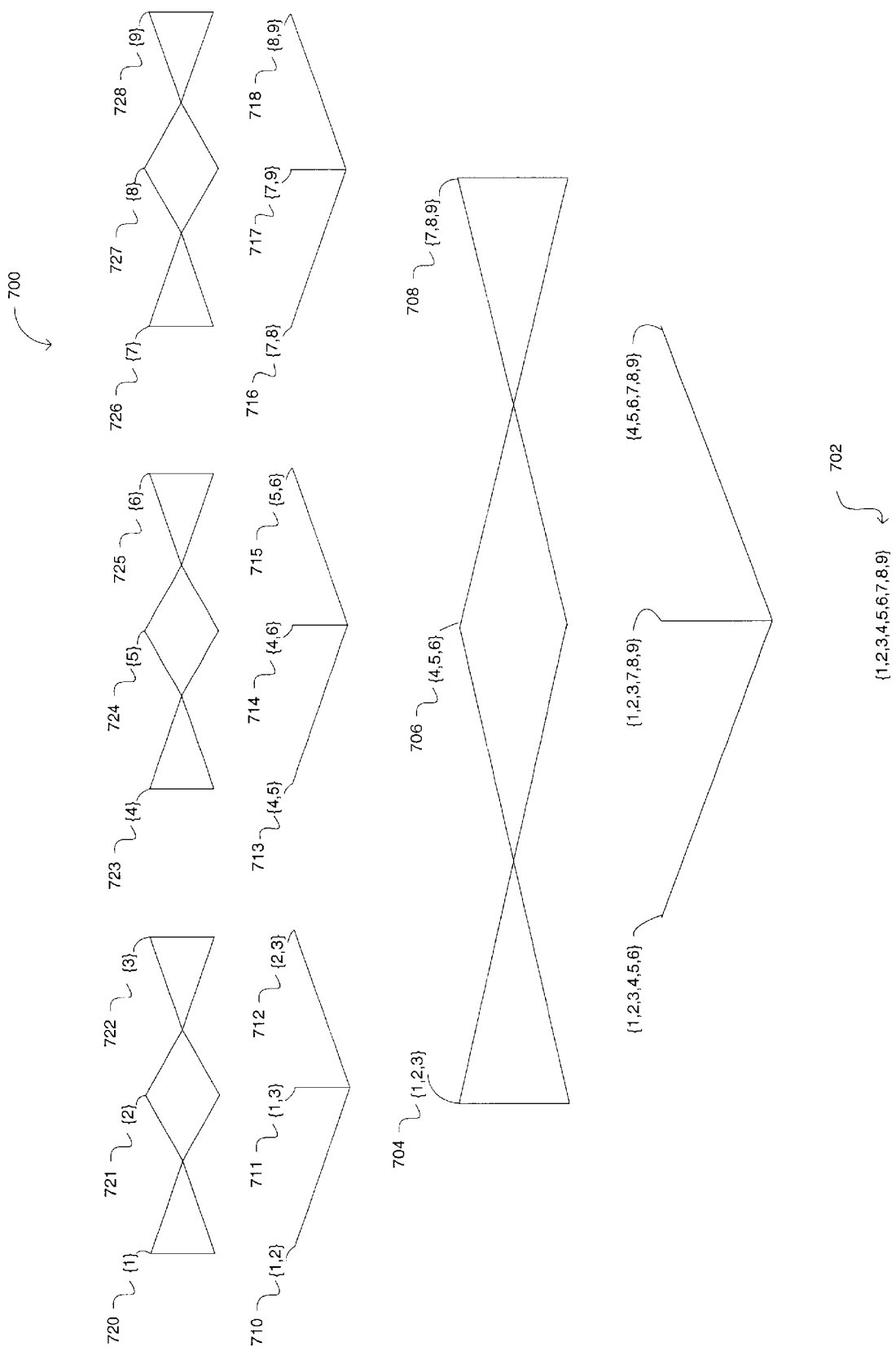
FIG. 7 illustrates a data revocation structure generated according to a second embodiment of the present invention.

FIG. 7 illustrates a data revocation structure 700 according to the present invention where N=9 and c=3. The universe is found at the root 702 of the structure. The three disjoint groups are the three sets of three elements 704, 706,

708 two levels above the root 702. (The connecting lines represent set inclusion.) Note that no member of the universe appears in more than one of these groups. These groups are referred to herein as "level one" groups. A power set (all sets and all possible subsets) is found for each of these level one groups. The power sets are the nine sets of two elements 710–718 one level above the level one sets. Note that the level two sets repeat members of the universe. Individual digital identities (certificates) 720–728 are represented by nodes at the "leaves" of the data revocation structure. Because small complement cover sets are desired, power sets of the universe (nine elements) are quite large and therefore are not found. Rather, the universe is divided into smaller sets. It is these smaller sets for which power sets are found. The level between the root 702 and the level one groups 704, 706, 708 include sets which are the union of the level one sets. The data revocation structure has $c2^c+1$ nodes (in this example (3×8)+1=25 nodes).

For each set S of F, the CA's cryptography device, such as the cryptography device 100 seen in FIG. 1, generates a chain $c_S$. That is, the CA's cryptography device generates the zero token value for each node in the data revocation structure 700 in the same manner as described above in relation to the binary tree method. For example, random strings may be assigned to each node as that node's initial token value. The data structure may be stored in a storage medium, such as main memory 104 or disk memory 106 of FIG. 1, or other storage medium.

Making A Certificate

For every user, the CA's cryptography device 100 has a collection of all of the sets in F which contain the certificate corresponding to that user. For each of these subsets, there is a chain (recall that for every set in F, there is a chain $c_S$. The certificate signed by the CA for a user includes the zero token value of each chain for each set in which that user is included. The certificate may be stored in a storage medium, such as main memory 104 or disk memory 106 of FIG. 1, or other storage medium.

Update Operation

Assume that $R_i$ certificates are revoked at some point, up to and including time period i. Each time period (say, for example, at the end of each day), the CA's cryptography device 100 performs a selection process and a token update process.

The Selection Process

Figure 8:
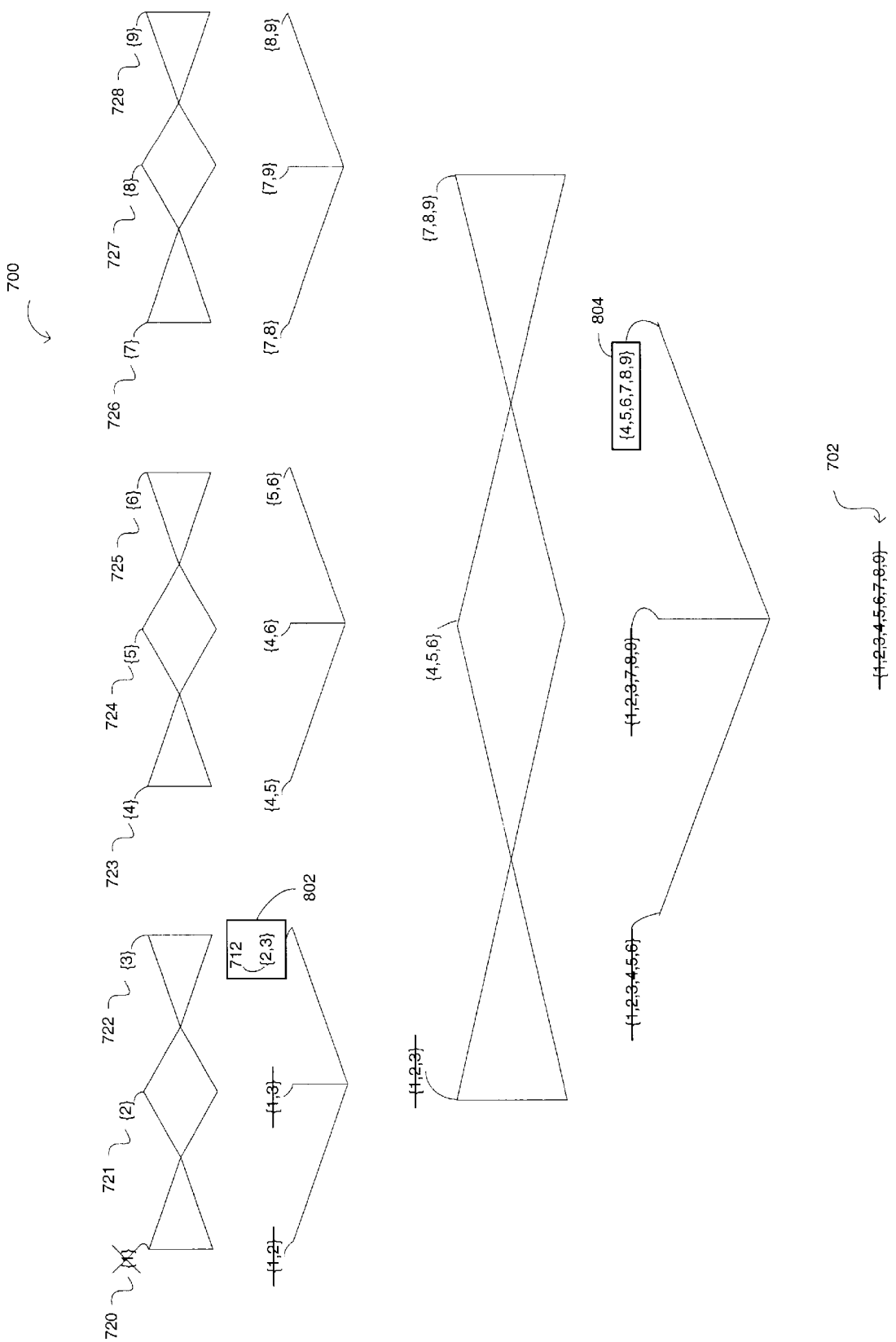
FIG. 8 illustrates the results of a selection process of the second embodiment of the present invention wherein one certificate is revoked.

In a manner similar to the selection process described above, the CA's cryptography device selects the day i verification sets to be the complement cover of $R_i$. The set of day-i verification token values is the i token values of each set in the complement cover of $R_i$. FIG. 8 illustrates the complement cover selection process performed by the CA's cryptography device 100. In FIG. 8, assume that the digital identity represented by node 720 is revoked. As seen in FIG. 8, the revoked node is marked with an X. The CA's cryptography device 100 eliminates from selection all sets including the revoked digital identity. As seen in FIG. 8, all gets including the certificate corresponding to the number 1 are not selected. These non-selected sets are identified in FIG. 8 by a strike through.

Once these non-selected sets are determined, the complement cover of $R_i$ may be determined by maximal subsets including all of the non-revoked certificates in the universe without repeating any certificate. In the example provided in FIG. 8, the universe includes {1,2,3,4,5,6,7,8,9}. {1} is revoked. The complement cover includes the following two sets {2,3} {4,5,6,7,8,9}. In FIG. 8 boxes 802, 804 represent the selection of these sets. Two of the twenty-six sets are selected for updating.

Figure 9:
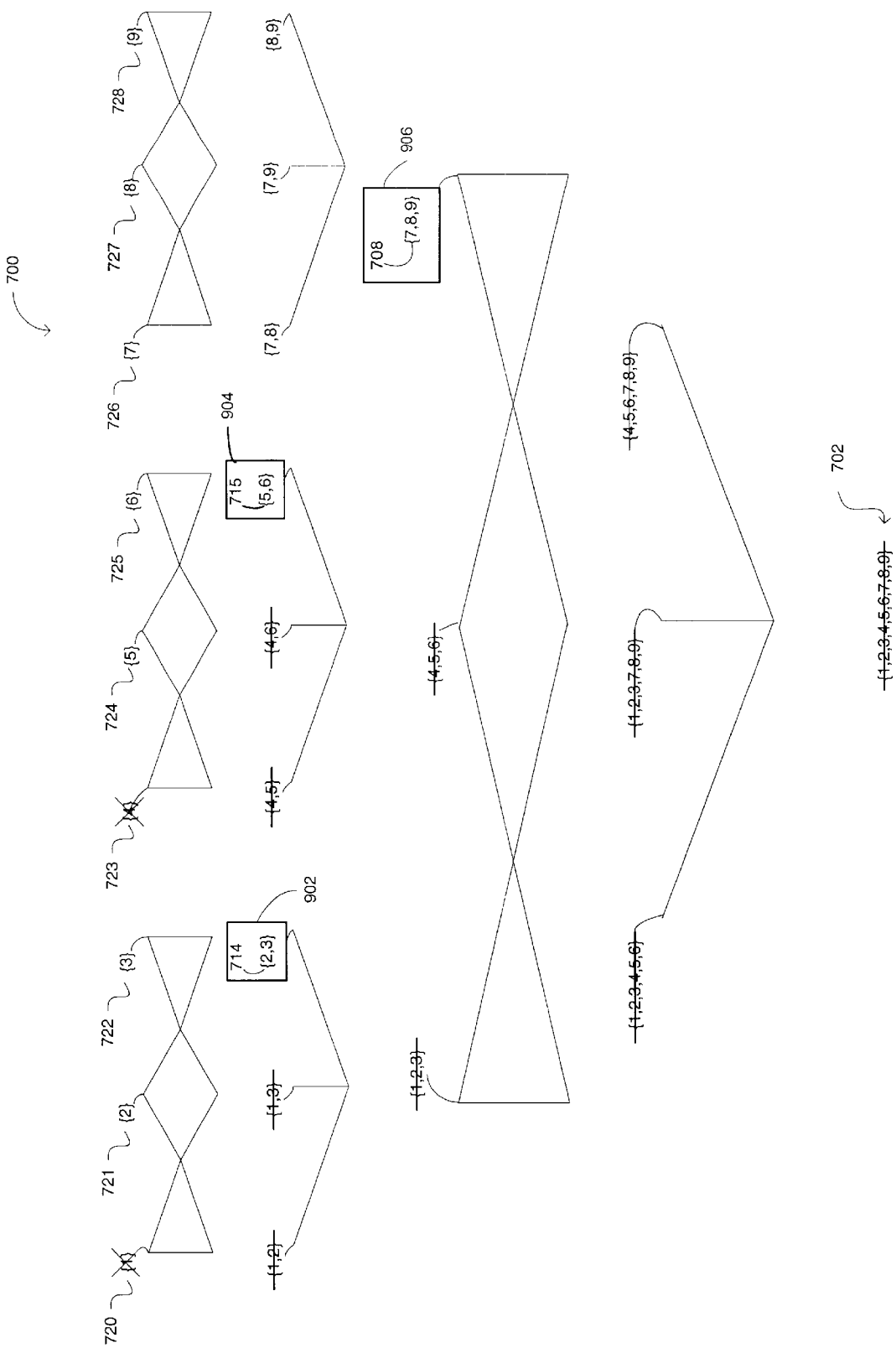
FIG. 9 illustrates the results of a selection process of the second embodiment of the present invention wherein two certificates are revoked.

In FIG. 9, assume that the certificates represented by nodes 720 and 723 are revoked (i.e., sets {1}, {4}). The revoked nodes are marked with an X. All sets including these revoked certificates are eliminated from selection. These non-selected sets are indicated by a strike through.

Once these non-selected sets are determined, the complement cover may be determined in the same manner as above. In the example provided in FIG. 9, the universe is {1,2,3,4,5,6,7,8,9}. {1}, {4} are revoked. The complement cover includes the following three sets {2,3}, {5,6}, {7,8,9}. In FIG. 9 boxes 902, 904, 906 represent the selection of these sets. A total of three of the twenty-six sets are selected for updating. The size of the complement covers is less than or equal to $r \log_c N/c^k - m \leq r \log_c N/r - c^k$. This can be shown using methods similar to those for the hierarchical scheme (k is the floor of log r).

In comparison to the CRS scheme, the present invention selects fewer tokens for updating. Using the above two examples, in the CRS scheme, eight and seven certificates would have been updated, respectively. In the present invention, however, only two and three tokens were selected for updating.

The Token Update Process

After the selection process is completed, the CA's cryptography device 100 performs the token update process to update the selected tokens. Assume it is day i of the system. For each set S selected in the selection process, the token value is updated from the previous token value to the ith token value in the chain $c_S$. This may be done in the same manner as described above. For example, if i=200 (the end of the $200^{th}$ day of the certificate), then the new token value will be $Y^{165}$.

Verifying A Certificate

A token is valid on day i+1 if it has been updated on day i. If on day i+1, a first party A wishes to verify a second party B's public key certificate, party A queries the CA. Recall that B's certificate includes the zero token value of each chain for each set in which B is included. In response to the query, the CA determines if any of the tokens in B's certificates are valid. If the certificate has at least one valid token in its chain, it is a valid certificate.

If the CA determines that B's certificate has no valid tokens, it sends nothing to A in response to the query or otherwise indicates to A that B's certificate has been revoked (such as by sending a revocation token). Otherwise, the CA sends to A one of the valid tokens. A's cryptography device 100 receives the token value and performs the one-way function on this value i times to obtain the zero token value. If the determined zero token value matches a zero token value on B's certificate, then the certificate is valid and belongs to party B.

The Cost of The General Method

The general method is generic to several methods. If the value of c is selected to be 1, then the method is Micali's CRS scheme, in which each certificate has a separate string of values and does not share any nodes with other certificates. This provides an (N,N-R) complement cover solution (where R is the number of revoked digital identities). If the value of c is selected to be 2, then the method is the binary tree method described above. This provides a 2N-1, R log (N/R) complement cover solution. If c is selected to be 3, this provides a 3N, (R/log3)log(N/R) complement cover solution. This is a 50% increase in the size of F from the c=2 scheme, but more than a 50% decrease in the size of the complement cover of F. Choosing c to be log N provides a low value for the complement cover size, but the complement cover family revocation and the data revocation structure height may be too large for practical use.

An Incremental Solution to Update Costs

Assume that on day 1, the CA revokes $r_1$, certificates and on day 2, the CA revokes $r_2$ certificates. Thus, the total number of revoked certificates is $r_1+r_2$. But on day 1, the $r_1$, certificates were updated and on day 2, the CA will consider both $r_1$ and $r_2$ certificates even though only $r_2$ certificates were revoked that day. Because the update cost is proportional to the number of revoked certificates under consideration, considering previously revoked certificates is an overhead "expense" which is preferably reduced or avoided. This overhead may be particularly undesirable if revocations are infrequent, but large in number. For example, assume a CA revokes the digital identities of delinquent accounts on the first day of every month. Assume that on the first day of the last month of a data revocation structure, the CA revokes 3000 identities, but revokes no other digital identities for the remainder of the month. Thus, by the end of the month, 3000×30=90,000 revoked certificates are considered. It is desirable to reduce the number of certificates considered during each update.

A solution to reduce this undesirable overhead is to change the verification step. Instead of having the CA provide a single valid token to verify the certificate, on day i+1, the user presents proof that its certificate was valid from day 1 through day i. Recall that every day (or other time period), at least one token for each valid certificate is updated, and no token is updated in the path of revoked tokens. Thus, a valid certificate will have a valid token for every day (or other time period) from day 1 to day i. On the other hand, no valid token exists for that user on the day his certificate was revoked. Because there is no valid token on that day, the user cannot present a valid token for days 1 through i (i.e., that user does not have a valid token for day i).

Figure 10A:
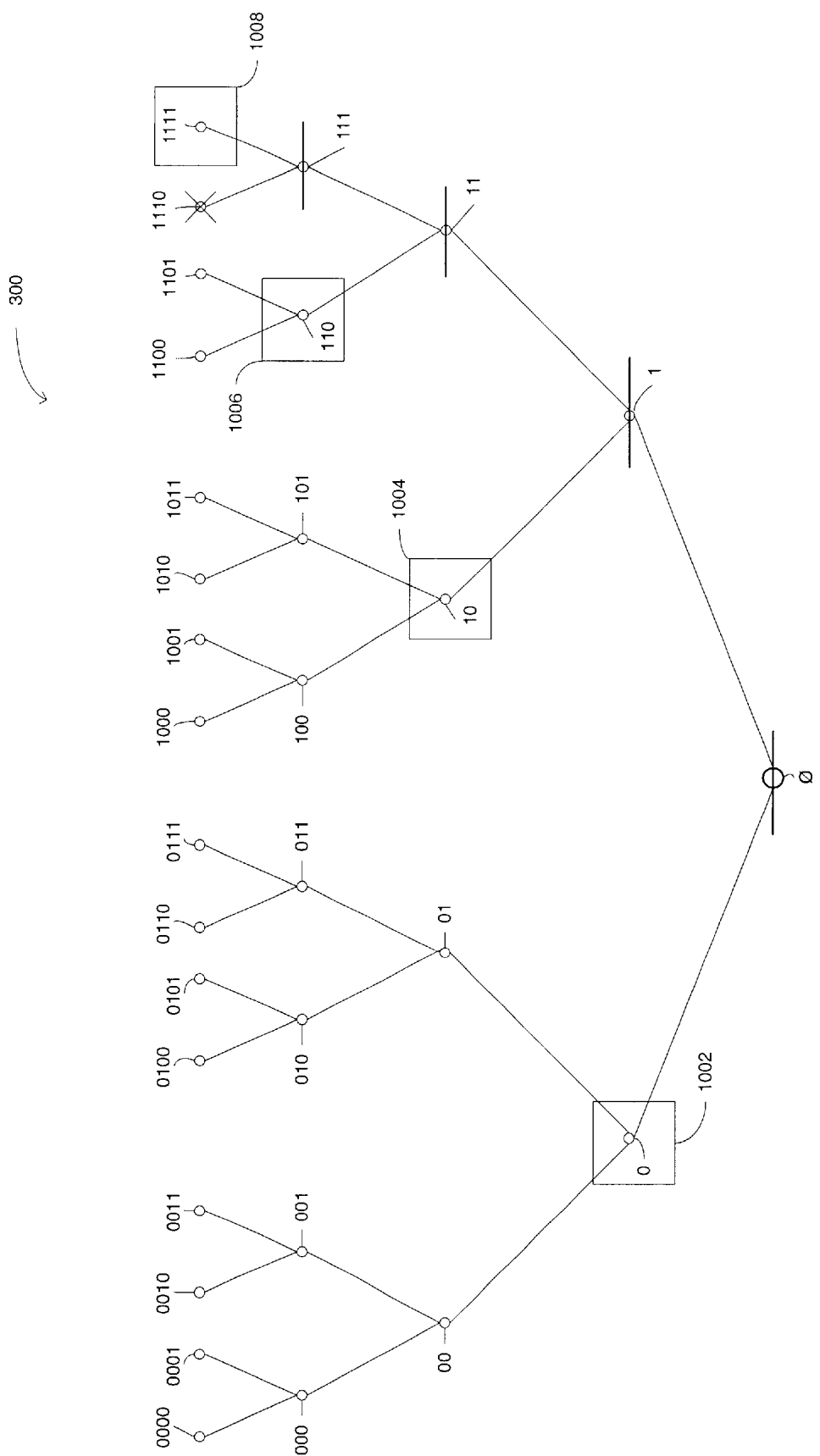
FIGS. 10A and 10B illustrate an incremental update method according to a third embodiment of the present invention.
Figure 10B:
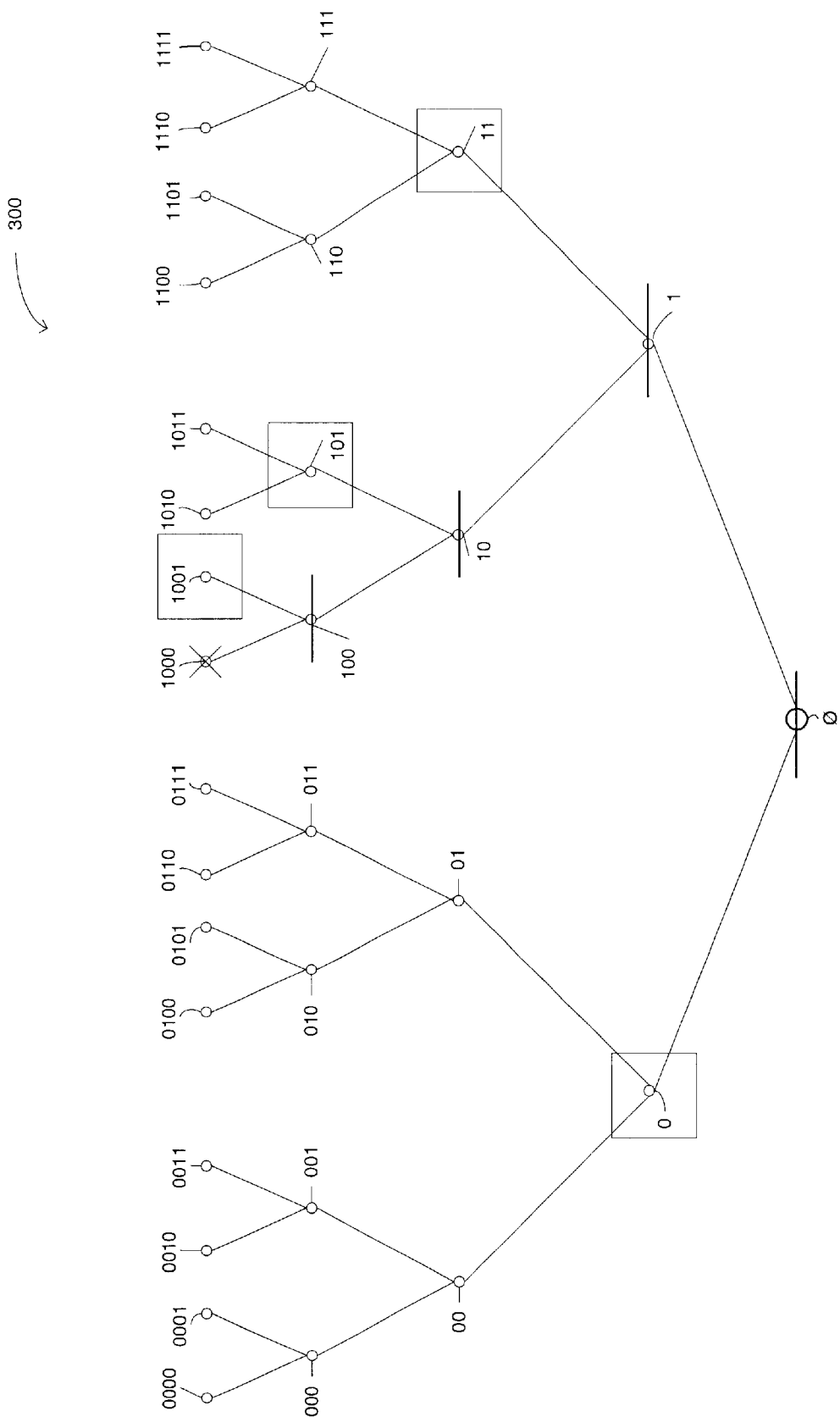

FIGS. 10A and 10B provide examples of this incremental solution to the update cost overhead problem using the binary tree 300 seen in FIGS. 6A and 6B. Assume that on day (or other time period) 1, certificate 1110 is revoked. The nodes that are selected to be updated are nodes 0, 10, 110, and 1111. Selection is illustrated by boxes 1002, 1004, 1006, 1008. Because none of these tokens are in the path for the user certificate represented by node 1110, that user cannot prove that its certificate was valid on day 1. Assume that on day i, the certificate 1000 is revoked. As seen in FIG. 10B, previously revoked token 1110 is not considered. Nodes 0, 11, 101, and 1001 are updated. Revoked token 1000 has no token updated on day i, and therefore cannot present a valid token for day i. Note that although previously revoked token 1110 may present an updated token for day i (token 11), it cannot present a valid token for day 1.

There is a problem with this method that may be easily corrected. As seen in FIG. 10B, after token 1110 is revoked, it may later obtain a "valid" token. The dishonest user's cryptography device, such as the cryptography device 100 of FIG. 1, may repeatedly perform the hash function on the token value received on day i and obtain what would have been a valid token on a future day.

To correct this potential for dishonest use, the (at least) D token values of each node should not be connected to each other in a chain-like manner (the nodes themselves are still connected in the manner seen in the figures). Instead of each node having an initial token value being a unique value hashed (at least) D times, at each node, the CA's cryptography device builds another tree having D×2 leaves. Each of the leaves is assigned a random value. For any internal (i.e., not a leaf) node u, the value assigned to it is $R_u=H(R_l,R_r)$ where $R_l$ is the value assigned to the left child node of the node u and $R_r$ is the value assigned to the right child node of the node u. H is a collision free hash function such as MD5. Each pair of leaves corresponds to a certificate for a day. The values of the sibling leaves are concatenated and hashed. This hash value is the value of the parent node. This concatenation/hashing is repeated to the root. This root is a zero token value in the user's digital identity (or certificate). For each user certificate, a collection of zero token values generated in this manner are connected in a path from leaf to root as described in the two previous embodiments. On day i, for each node v in the day-i verification set, the CA gives the log (2×D)+1 hash values needed to compute the path from leaf 2i in the hash tree to the zero token associated with the node v. Call this the day i verification path for node v.

Note that given the day-j (1j<i) verification paths for node v, it is computationally infeasible to compute the day-i verification path for v. This is because even if j was the day before i, at least one node (the leaves' parent node) is not common to these two paths and thus this uncommon node cannot be determined from their common parent node.

Recall that each user's certificate contains log N zero tokens, one for each node in the labelled tree on the path from the user's digital identity or certificate to the root. Previously, for a user to be verified on day i, the verifier would need a day-i verification path for one of the user's zero tokens. The protocol is changed as follows. On day i, the CA computes the day-i verification set of nodes in the labelled tree using only the digital identities revoked the previous day and does not consider the digital identities revoked previously. The CA sends to the directory a day-i verification path for each node in the day-i verification set. Now, for a user to be verified on day i, the verifier will need a day-1 through day-i verification path with the additional property that the root of each of the verification paths is contained in the set of zero token values in the user's certificate.

Figure 11:
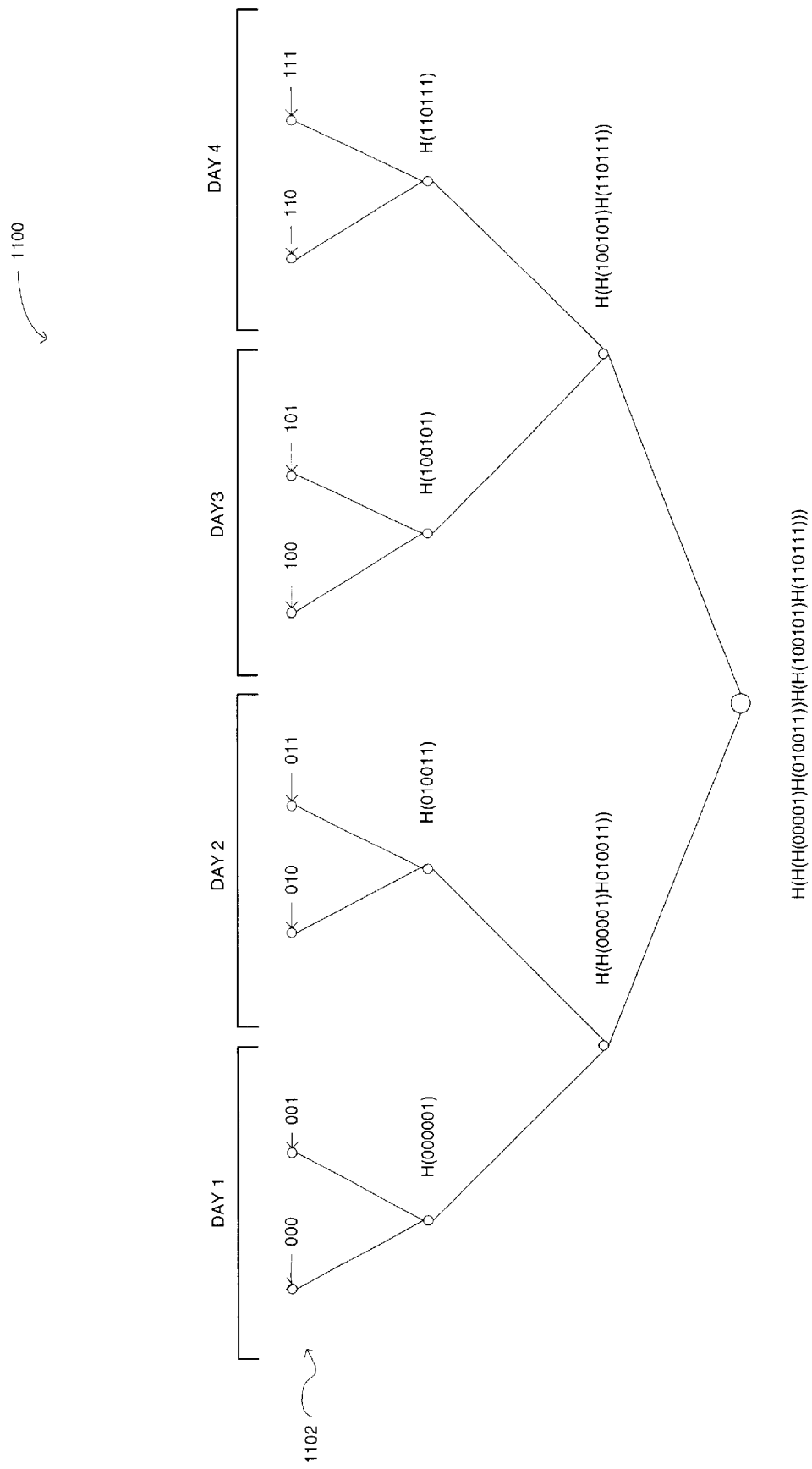
FIG. 11 illustrates a tree formed for one node according to the third embodiment of the present invention.

FIG. 11 illustrates a simple binary tree 1100 for a node, say for example, node 101 in FIGS. 10A and 10B. This tree may be generated by the CA's cryptography device. In FIG. 11, D is 4 and therefore the tree 1100 has D×2=8 leaves 1102. Each of the leaves 1102 is assigned a random number. Each "parent" node is assigned a number which is the hash of the concatenation of left and right child nodes.

For a user to show a valid certificate for day i, the user presents a pair of leaves in the tree for day i for the node validated for day i and a path to the root of the tree for the node and the corresponding siblings at each level, so that the path to the root can be verified. For example, in FIG. 11 on day 2, the user presents the day 2 leaves 1104, 1106 and nodes 1108, 1110, 1112, 1114.

In the example given above, if, on the first day of the month, 3000 digital identities are revoked and no others are revoked for the rest of the month, the 3000 revoked digital identities are considered on the first day. No other revocations are considered that month. As a result, 90,000−3,000= 87,000 fewer revocations are considered. This incremental method is safe because a revoked user cannot present a revoked certificate as valid.

This scheme substantially reduces the CA-to-directory communications costs. It can be shown that the average daily cost is proportional to at most (R/D) log (DN/R) where R is the total number of revocations throughout the year. Of course, this reduction is gained at the expense of a larger communication requirement for the verifier which is proportional to i for day i. This latter communication requirement can be reduced to log D by requiring the CA to produce incremental verification paths for the log D times scales of two days, four days, eight days, etc. This only increases the average daily communication cost of the CA by a factor of 2.

Those skilled in the art readily appreciate that the hash trees described in this third embodiment may replace the chains described in the first and second embodiments. In situations where D is very large, the increase in tokens and reduction in calculations may be desirable.

In a practical implementation of the present invention, a CA may have two data revocation structures available at all times, each data revocation structure having nodes with a life span greater than D, such as 2D. This means that the one way function may be performed on each node's initial token value more than D times. Therefore, if a digital identity is added to a first data revocation structure during the final time period D, the nodes of the data revocation structure continue to exist for the entire lifetime of D of that identity. Digital identities generated after this last digital identity may be added to a second data revocation structure. Also, in a preferred embodiment of the present invention, a data revocation structure is filled in with digital identities in a balanced manner. Referring to FIG. 3, a first digital identity may be placed at the leaf identified as 0000, and a second digital identity would be placed at the leaf identified as 1111. A third digital identity would be place at the leaf identified as 0111, and a fourth digital identity would be placed at the leaf identified as 1000. That is, the digital identities are added so that the number of nodes are balanced on the data revocation structure.

Cost Comparison of The Prior Art With the Inventive Method

The update and communication costs of the prior art CRL and CRS methods are compared with the inventive methods. The relevant parameters are:

N: Number of certificates in the cryptosystem

R: Number of revoked certificates in the cryptosystem

Q: Expected number of daily certificate status queries

Note that in a typical cryptosystem, N and Q are expected to be on the order of a few millions and R is expected to be on the order of a few hundred thousand.

In the CRL scheme, a list of all of the revoked certificates is provided to users. The daily update cost is O(R), meaning on the order of the number of revoked certificates in the cryptosystem. This is because the length of the a CRL is proportional to R. The expected total daily queries is O(QR) because a response to each query is the CRL of length O(R) and the expected number of queries is Q.

In the CRS scheme, each certificate has its own chain of token values and a query response from the CA includes a token value. The total daily update cost is O(N), because each certificate is updated daily. The expected total daily queries is O(Q) because the CA sends a 100 bit answer (a token) in response to each query.

In the first and second embodiments of present invention, the total daily update cost is O(Rlog(N/R)) as described above. The query cost is O(Q) as described above. Thus, the overall costs are lower for the present invention than for either of the prior art methods. For example, although the update costs for the CRL method are low, the communications costs are very high. Thus, the overall cost is high. The update costs for the CRS method are higher than for the present invention and the communications costs are the same. Therefore, the inventive method for revoking digital identities is more efficient than the prior methods.

The above described embodiments of the invention are intended to be illustrative only. For example, the inventive methods may be used in connection with revocations structures which do not use public key cryptography or cryptography devices. Numerous alternative embodiments may be devised by those skilled in the art without departing from the spirit and scope of the following claims.

We claim:

1. A digital identity revocation method for a plurality of digital identities, the method comprising the steps of:
   a. a certification authority (CA) device grouping the plurality of digital identities into sets, at least one of the sets including a plurality of digital identities and at least one of said digital identities belonging to more than one set;
   b. the CA device associating revocation checking information with each set;
   c. the CA device associating with each digital identity said revocation checking information for each set to which the digital identity belongs;
   d. the CA device identifying at least some sets not containing a revoked digital identity; and
   e. a device determining whether a particular digital identity is revoked by comparing the revocation status information with the revocation checking information associated with the digital identity.

2. A digital identity revocation method for a plurality of digital identities, the method comprising the steps of:
   a. a certification authority (CA) device grouping the plurality of digital identities into sets, at least some of the sets including a plurality of digital identities, wherein the step of grouping comprises generating a binary tree having a height l and in which the plurality of digital identities comprise the leaves of the tree at level l and a pair of leaves are combined define a node at level l-1, a pair of nodes at level l-1 are combined to define a node at level l-2, and so on to the root;
   b. the CA device associating revocation checking information with each set;
   c. the CA device associating with each digital identity said revocation checking information for each set to which the digital identity belongs;
   d. the CA device identifying at least some sets not containing a revoked digital identity, and
   e. a device determining whether a particular digital identity is revoked by comparing the revocation status information with the revocation checking information associated with the digital identity.

3. A digital identity revocation method for a plurality of digital identities, the method comprising the steps of:
   a. a certification authority (CA) device grouping the plurality of digital identities into sets, at least some of the sets including a plurality of digital identities, wherein the step of grouping comprises generating a plurality of singleton, each singleton set containing one of the plurality of digital identities, grouping the singleton sets into c disjoint sets, and grouping the c disjoint sets into larger sets;
   b. the CA device associating revocation checking information with each set;
   c. the CA device associating with each digital identity said revocation checking information for each set to which the digital identity belongs;
   d. the CA device identifying at least some sets not containing a revoked digital identity; and
   e. a device determining whether a particular digital identity is revoked by comparing the revocation status information with the revocation checking information associated with the digital identity.

4. A method for verifying validity of a particular one of a plurality of digital identities, the particular one of the digital identities being valid for a period of time D, the method comprising the steps of:
   a. a certification authority's (CA) device generating a data revocation structure, the data revocation structure having a root and leaves, each leaf representing a digital identity and each leaf having a path from that leaf to the root, the path comprising a number of nodes, at least one of the nodes being shared with at least one other leaf, each of the nodes including a zero token;
   b. the CA's device periodically updating the nodes in the data revocation structure to indicate valid digital identities;
   c. in response to a query from a recipient's device into validity of the particular digital identity:
      i. the CA's device determining whether an updated node exists in the path for the particular digital identity; and
      ii. if an updated node exists for the particular digital identity, the device transmitting information including at least the updated node in response to the query; and
   d. a recipient device receiving the transmitted information and performing a one-way function on at least some of the transmitted data a predetermined number of times and determining whether the result is the same as a zero token on the digital identity.

5. The method of claim 4, wherein the method is for use in a public key cryptography system and the CA device is a cryptography device.

6. The method of claim 4, further comprising generating the zero tokens by:
   a. providing a unique value for a node; and
   b. performing a one-way function on the unique value at least D times.

7. The method of claim 6, wherein in response to a query at time i from a recipient's device, the step of performing a one-way function on at least some of the transmitted information further comprises performing the one-way function on the updated node in the transmitted information i times.

8. The method of claim 4, further comprising the step of the CA's device generating the digital identity for the particular user and including with the digital identity each of the zero tokens in the path for that digital identity.

9. The method of claim 4, wherein the step of generating the data revocation structure further comprises the CA's device generating the data revocation structure in the form of a binary tree.

10. The method of claim 4, wherein the step of generating the data revocation structure further comprises the CA's device generating a data revocation structure by dividing the plurality of digital identities into sets comprising c disjoint groups, where c2, and generating larger sets from of the c disjoint groups.

11. The method of claim 10, wherein the step of generating the data revocation structure further comprises the CA's device generating a chain for each set comprising c disjoint groups and each larger set.

12. The method of claim 11, wherein the step of generating a chain further comprises the CA's device performing a one-way function at least D times on the set or larger set to generate the zero tokens.

13. The method of claim 4, wherein the step of generating the revocation data structure further comprises the CA's device generating a tree at each node, each tree having D×2 leaves, and generating each parent node from each leaf to a root of the tree by concatenating a value of each child and hashing the concatenation.

14. The method of claim 13, wherein the root of the trees are used as the zero tokens in the data revocation structure.

15. The method of claim 13, wherein the transmitted information includes at least a portion of the tree for each updated node.

16. The method of claim 15, wherein the step of performing the one-way function further comprises performing the one-way function on the portions of the tree included in the transmitted information.

17. The method of claim 4, wherein the step of periodically updating further comprises the CA's device selecting particular nodes and updating the selected nodes.

18. The method of claim 17, wherein the step of selecting particular nodes further comprises the steps of the CA's device selecting a fewest number of nodes in which:
   a. at least one selected node is on a path from each leaf representing a valid digital identity to the root of the data revocation structure; and
   b. none of the selected nodes is on a path from any revoked digital identity to the root of the data revocation structure.

19. The method of claim 18, wherein the step of updating a node further comprises updating a node at a time period i by the CA's device performing a one-way function on the unique value of the selected node D-i times.

20. The method of claim 18, wherein the step of updating a node further comprises updating a node at a time period i by the CA's device retrieving from a memory a token corresponding to the unique value of the selected node on which a one-way function hag been performed D-i times.

21. The method of claim 4, wherein the step of updating wherein the step of updating at a time i comprises updating only digital identities revoked since a previous update.

22. The method of claim 21, wherein the step of transmitting information further comprises transmitting information for each time period from a first time period to time i.

23. A method for generating a data revocation structure having a plurality of digital identities, comprising the steps of a device:
   a. generating a binary tree having a number of nodes and wherein each leaf of the tree represents one of the plurality of digital identities;
   b. for each node, generating a unique number associated with the node; and
   c. performing on each unique number a one-way function at least D times to generate a zero token, wherein D is a time period that each digital identity is valid.

24. The method of claim 23, wherein the step of performing a one-way function further comprises the step of the device performing a one-way hash function.

25. The method of claim 23, further comprising the device generating a certificate for a particular one of the plurality of digital identities and including on the certificate each of the zero tokens in a path from a leaf in the data revocation structure corresponding to the particular one of the plurality of digital identities to the root of the binary tree.

26. A method for generating a data revocation structure having a plurality of digital identities, comprising the steps of a device:
   a. generating a plurality of singleton sets, each singleton set including one of the plurality of digital identities;
   b. grouping the singleton sets into c disjoint groups, where c 2; and
   c. generating larger sets from the c disjoint groups.

27. The method of claim 26, wherein the step of generating the data revocation structure further comprises the device generating a chain for the c disjoint groups, and each larger set.

28. The method of claim 27, wherein the digital identities being valid for a period of time D and step of generating a chain further comprises the device performing a one-way function at least D times on the first set, the c disjoint groups, and each larger set to generate zero token values.

29. The method of claim 28, wherein the step of performing a one-way function further comprises the step of the device performing a one-way hash function.

30. The method of claim 29, further comprising the device generating a certificate for a particular one of the plurality of digital identities, including on the certificate each of the zero token values in a path from a leaf in the data revocation structure corresponding to the particular one of the plurality of digital identities in the first set.

31. A digital identity comprising a plurality of zero tokens generated according to the method of claim 23.

32. A digital identity comprising a plurality of zero tokens generated according to the method of claim 28.

33. A method for verifying a digital identity being valid for a period of time D, the digital identity having associated with it a number of values representing a plurality of nodes shared with at least one other digital identity, each node having a unique value on which a one-way function has been performed at least D times to generate zero tokens, the method comprising the steps of:

a. receiving an updated token from a certification authority, the updated token corresponding to one of the unique values associated with the digital identity on which unique value the one-way function has been performed D-i times, where iD;
  b. performing the one-way function on the updated token i times;
  c. determining whether the result of step b matches one of the zero tokens; and
  d. if the result of step c results in a match, determining that the digital identity is verified.

34. A method for verifying a digital identity at a time i, the digital identity being valid for a period of time D and Di, the digital identity having associated with it a number of values representing a plurality of nodes shared with at least one other digital identity, each node having associated with it a zero token value generated by a certification authority device generating a tree at each node, each tree having D×2 leaves, and generating each parent node from each leaf to a root of the tree by concatenating a value of each child and hashing the concatenation, the method comprising the steps of:

a. receiving at least a portion of the tree for the updated node from a certification authority;
  b. performing the one-way function on the portion of the tree a predetermined number of times;
  c. determining whether the result of step b matches one of the zero tokens; and
  d. if the result of step c results in a match, determining that the digital identity is verified.

35. The method of claim 34, wherein:

a. the step of receiving further comprises receiving at least a portion of the tree for updated nodes for each time period from a first time period to time period i;
  b. performing the one-way function on each of the portions of the trees for each time period from a first time period to time period i; and
  c. determining whether each result of step b matches one of the zero tokens for that digital identity.

* * * * *